(12) United States Patent
Van Der Borg et al.

(10) Patent No.: US 11,598,367 B2
(45) Date of Patent: Mar. 7, 2023

(54) ELEMENT COMPRISING A NON-STICK SURFACE AND METHOD FOR THREE-DIMENSIONAL PRINTING SUCH AN ELEMENT

(71) Applicant: SPACE-XYZ IP B.V., Terborg (NL)

(72) Inventors: Lodewijk Stephanus Margaretha Joseph Van Der Borg, Terborg (NL); Jan Jacob Bulsink, Terborg (NL); Franciscus Quirinus Fredrik Verouden, Terborg (NL)

(73) Assignee: SPACE-XYZ IP B.V., Terborg (NL)

( * ) Notice: Subject to any disclaimer, the term of this patent is extended or adjusted under 35 U.S.C. 154(b) by 234 days.

(21) Appl. No.: 16/652,271

(22) PCT Filed: Oct. 1, 2018

(86) PCT No.: PCT/NL2018/050651
§ 371 (c)(1),
(2) Date: Mar. 30, 2020

(87) PCT Pub. No.: WO2019/066659
PCT Pub. Date: Apr. 4, 2019

(65) Prior Publication Data
US 2020/0318679 A1    Oct. 8, 2020

(30) Foreign Application Priority Data

Sep. 29, 2017  (NL) ..................................... 2019654

(51) Int. Cl.
*F16C 17/02*     (2006.01)
*B33Y 10/00*    (2015.01)
(Continued)

(52) U.S. Cl.
CPC ................ *F16C 17/02* (2013.01); *A21C 3/10* (2013.01); *A21C 9/08* (2013.01); *B22F 10/20* (2021.01);
(Continued)

(58) Field of Classification Search
None
See application file for complete search history.

(56) References Cited

U.S. PATENT DOCUMENTS 8,573,193 B2    11/2013  Khoshnood
9,254,535 B2     2/2016  Buller et al.
(Continued)

FOREIGN PATENT DOCUMENTS

CN    103442830 A    12/2013
CN    106414040 A     2/2017
(Continued)

OTHER PUBLICATIONS

Search Report from corresponding Netherlands Application No. NL 2019654, dated Jun. 4, 2018.
(Continued)

*Primary Examiner* — Jacob T Minskey
*Assistant Examiner* — Adrien J Bernard
(74) *Attorney, Agent, or Firm* — Workman Nydegger

(57) ABSTRACT

An element comprising a non-stick surface for substantially cleanly removing a product which is arranged against said non-stick surface. The element comprises a first layer of an pervious material, which is configured to allow a fluid to flow there through. An outer surface of said first layer provides the non-stick surface. The element comprises a second layer of an impervious material, which is configured to substantially block a flow of fluid there through. The second layer is arranged at a side of said first layer opposite to the outer surface. The element comprises ducts or cham-
(Continued)

bers which are arranged in said first layer or in between said first and second layer. Said ducts or chambers are arranged in fluid connection with said pervious material and are configured for feeding a pressurized fluid to the pervious material. At least the first layer is formed using a three-dimensional printing tool.

15 Claims, 10 Drawing Sheets

(51) Int. Cl.
    *B33Y 80/00* (2015.01)
    *A21C 3/10* (2006.01)
    *A21C 9/08* (2006.01)
    *B62D 35/00* (2006.01)
    *B63B 1/34* (2006.01)
    *B64C 23/00* (2006.01)
    *B22F 10/20* (2021.01)

(52) U.S. Cl.
    CPC ............... *B33Y 10/00* (2014.12); *B33Y 80/00* (2014.12); *B62D 35/00* (2013.01); *B63B 1/34* (2013.01); *B64C 23/005* (2013.01)

(56) References Cited

U.S. PATENT DOCUMENTS

| | | | |
|---|---|---|---|
| 9,346,127 B2 | 5/2016 | Buller et al. | |
| 9,399,256 B2 | 7/2016 | Buller et al. | |
| 9,403,235 B2 | 8/2016 | Buller et al. | |
| 9,486,878 B2 | 11/2016 | Buller et al. | |
| 9,573,225 B2 | 2/2017 | Buller et al. | |
| 9,586,290 B2 | 3/2017 | Buller et al. | |
| 9,821,411 B2 | 11/2017 | Buller et al. | |
| 9,902,113 B2 | 2/2018 | Matsumoto et al. | |
| 10,195,693 B2 | 2/2019 | Buller et al. | |
| 10,493,564 B2 | 12/2019 | Buller et al. | |
| 10,507,549 B2 | 12/2019 | Buller et al. | |
| 10,913,207 B2 | 2/2021 | Ederer et al. | |
| 2014/0010908 A1 | 1/2014 | Matsumoto et al. | |
| 2015/0367415 A1 | 12/2015 | Buller et al. | |
| 2015/0367416 A1 | 12/2015 | Buller et al. | |
| 2015/0367417 A1 | 12/2015 | Buller et al. | |
| 2015/0367418 A1 | 12/2015 | Buller et al. | |
| 2015/0367419 A1 | 12/2015 | Buller et al. | |
| 2015/0367446 A1 | 12/2015 | Buller et al. | |
| 2015/0367447 A1 | 12/2015 | Buller et al. | |
| 2015/0367448 A1 | 12/2015 | Buller et al. | |
| 2016/0121399 A1 | 5/2016 | Buller et al. | |
| 2016/0207109 A1 | 7/2016 | Buller et al. | |
| 2016/0297006 A1 | 10/2016 | Buller et al. | |
| 2016/0297007 A1 | 10/2016 | Buller et al. | |
| 2017/0021420 A1 | 1/2017 | Buller et al. | |
| 2017/0144254 A1 | 5/2017 | Buller et al. | |
| 2017/0182711 A1 | 6/2017 | Ederer et al. | |
| 2017/0189963 A1 | 7/2017 | Buller et al. | |
| 2017/0334024 A1 | 11/2017 | Buller et al. | |
| 2021/0107227 A1 | 4/2021 | Ederer et al. | |

FOREIGN PATENT DOCUMENTS

| | | |
|---|---|---|
| CN | 106488819 A | 3/2017 |
| JP | 2002322501 A | 11/2002 |
| WO | 2004002229 A2 | 1/2004 |
| WO | 20170117527 A1 | 7/2017 |

OTHER PUBLICATIONS

International Search Report and Written Opinion from PCT Application No. PCT/NL2018/050651, dated Apr. 29, 2019.

Office Action from corresponding Chinese Application No. 201880076668.0, dated Aug. 25, 2021.

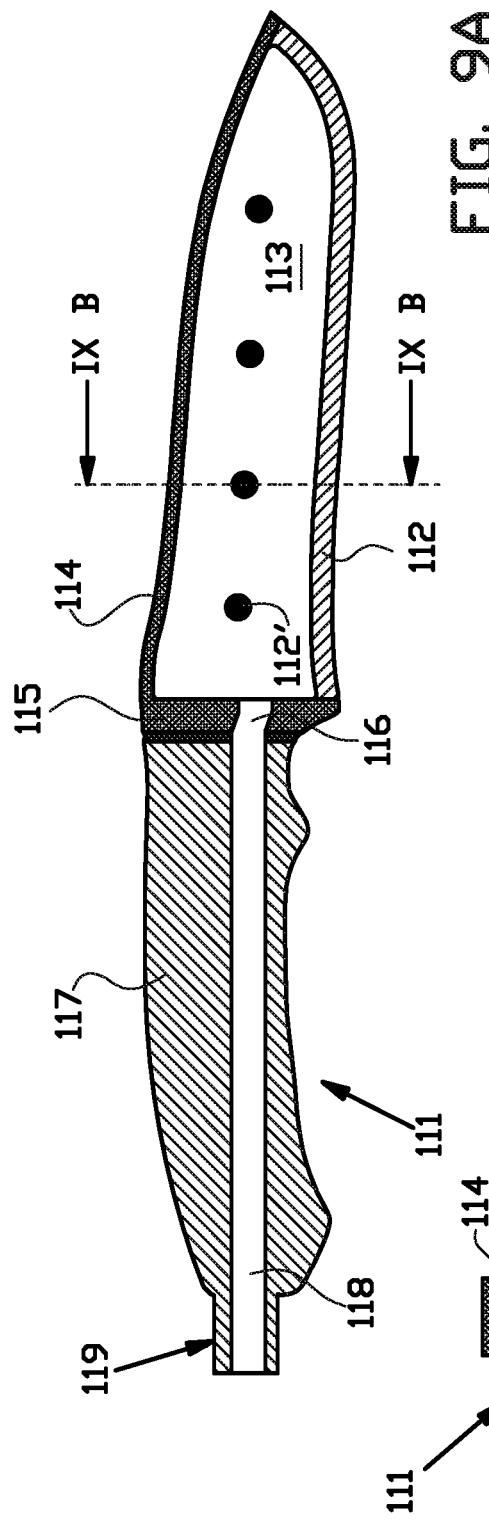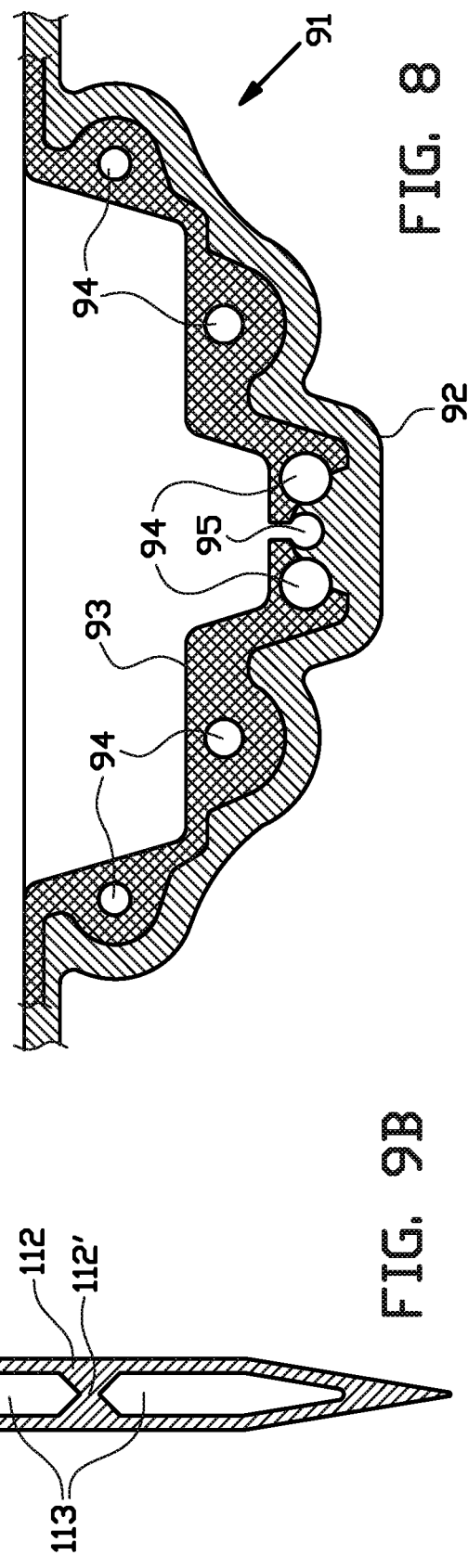

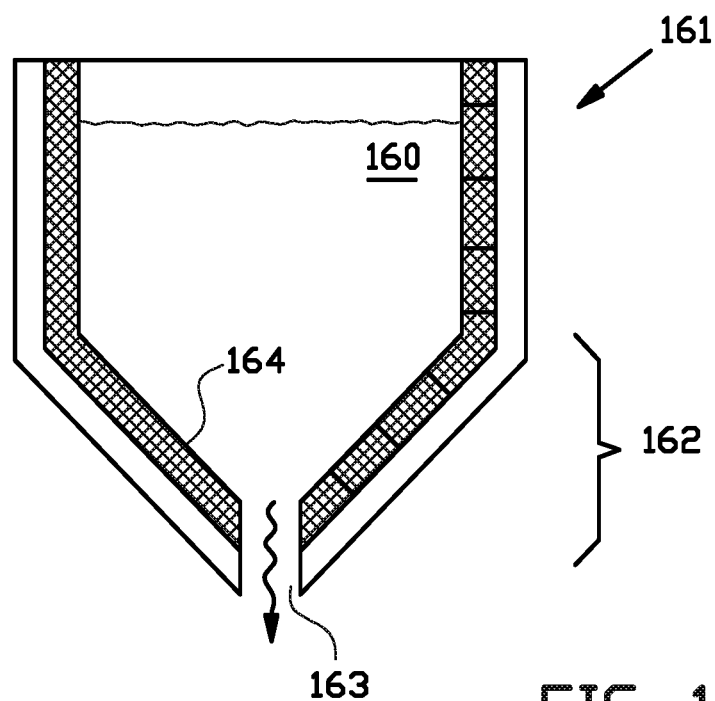
FIG. 10A
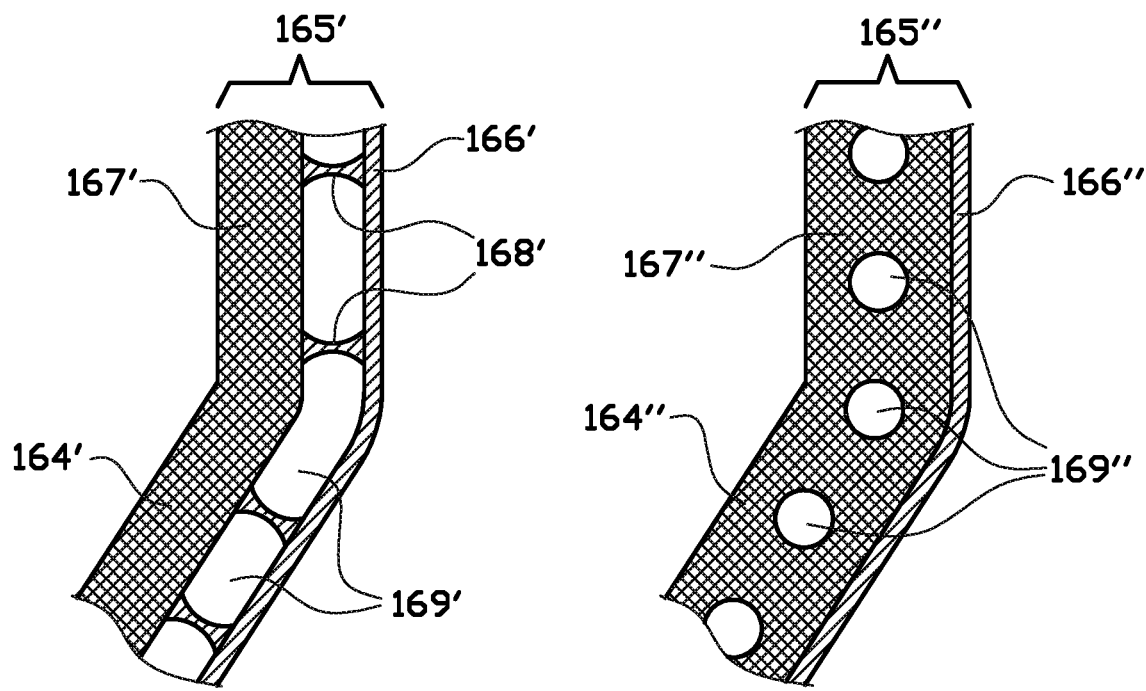
FIG. 10B
FIG. 10C

ELEMENT COMPRISING A NON-STICK SURFACE AND METHOD FOR THREE-DIMENSIONAL PRINTING SUCH AN ELEMENT

BACKGROUND

The invention relates to an element comprising a non-stick surface for substantially cleanly removing a product which is arranged against said non-stick surface. The invention further relates to a method for producing such an element with a non-stick surface by means of a three-dimensional printer.

A non-stick surface is a surface engineered to reduce the ability of other materials to stick to it. An area where non-stick surfaces is frequently used is the food industry. For example in industrial bakery technology for the production of bread, baguette, cake, ciabatta, pizza, puff pastry, rolls, buns and cookies, pieces of dough transported to and handled at various handling stations on top of proofing trays and/or baking trays. Such trays are commonly provided with anti-adhesion or non-stick coating based on fluoropolymers or rubber silicones.

A disadvantage of using such known anti-adhesion or non-stick coatings is, that due to wear during the use of such trays, abrasion or damaging of the non-stick coating may occur and regular re-coating of the trays is required.

It is an object of the present invention to least partially solve the above identified disadvantage and/or to provide an alternative element with non-stick surface. It is further an object of the present invention to provide a method for producing such an element, preferably using a three-dimensional printing technique.

SUMMARY OF THE INVENTION

According to a first aspect, the invention provides an element comprising a non-stick surface for substantially cleanly removing a product which is arranged against said non-stick surface,
wherein the element comprises a first layer of an pervious material, wherein the pervious material is configured to allow a fluid to flow there through, and wherein an outer surface of said first layer provides the non-stick surface, and wherein the element comprises a second layer of an impervious material, wherein the impervious material is configured to substantially block a flow of the fluid there through, and wherein the second layer is arranged at a side of said first layer opposite to the outer surface,
wherein the element comprises one or more ducts or chambers which are arranged in said first layer or in between said first and second layer, wherein said one or more ducts or chambers are arranged in fluid connection with said pervious material and are configured for feeding a pressurized fluid to the pervious material,
wherein at least the first layer is formed by sintering a powder material preferably by using a three-dimensional printing tool.

Commonly known non-stick coatings are based on materials which provide a very smooth surface and a low coefficient of friction. The present invention provides a fundamentally new concept and design of non-stick surfaces, by using an layer of pervious or porous material.

According to the present invention, the element is configured to feed a pressurized fluid to the pervious material. This pressurized fluid is transmitted through the pervious material of the first layer and exits the first layer at the outer surface. Accordingly, the pressurized fluid can act on a product which is placed against or onto the outer surface. When the product needs to be removed from the outer surface, the one or more ducts or chambers are provided with pressurised fluid and the pressurized fluid pushes the product away from the outer surface, which can provide a substantially clean removal of the product, substantially without leaving any residual product behind on the outer surface. Accordingly, the outer surface of the element thus provides a non-stick surface.

In addition, the non-stick properties of the outer surface of the element can be switched on and off by controlling the pressure of the fluid.

According to the invention, the first layer is formed by sintering a powder material preferably by using a three-dimensional printing tool. Sintering of a powder material provides a pervious or porous layer with small pores having a diameter which is generally smaller than the diameter of the powder particles used for producing the pervious material. Preferably, the size of the powder particles is selected such that the pores in the pervious material are large enough to allow a fluid to flow through the pervious material, and are small enough such that the material of the product substantially does not penetrate into the pores of the pervious material.

At least the first layer is preferably formed using a three-dimensional printing tool, which allows a very accurate shaping of the outer surface. When using laser additive manufacturing as a three-dimensional printing tool, the laser used for sintering the powder particles can be focussed to a very small light spot which enables to manufacture very small features with sharp transitions.

In an embodiment, at least the first layer, the second layer and the one or more ducts or chambers are integrally formed using a three-dimensional printing tool. The three-dimensional printing tool is used to create pervious and impervious material and to create the one or more ducts or chamber. Accordingly, the first layer, the second layer and the one or more ducts or chambers are integrally formed to provide the element of the present invention.

In an embodiment, the first layer and/or the one or more ducts or chambers are configured to distribute the fluid over the pervious material, preferably to distribute the fluid over the non-stick surface, more preferably to evenly distribute the fluid over the non-stick surface. By distributing the fluid over the pervious material, the non-stick properties of the outer surface can be provided substantially over the whole outer surface.

In an embodiment, the one or more ducts or chambers extend in a direction substantially parallel to the non-stick surface. Accordingly, the one or more ducts or chambers assistance to distribute the fluid over the first layer.

In an embodiment at least the first layer and/or the one or more ducts or chambers are configured to provide substantially the same pressure drop of the pressurised fluid over the pervious material in a fluid path from the one or more ducts or chambers to the non-stick surface. In an embodiment, at least the first layer and/or the one or more ducts or chambers are configured to provide substantially the same pressure of the pressurised fluid at the non-stick surface. By configuring the first layer and/or the one or more ducts or chambers to provide the same pressure drop over the pervious material and/or to provide the same pressure of the fluid at the non-stick surface, a force or pressure exerted by the fluid on the product is substantially constant over the substantially the whole non-stick surface.

According to a second aspect, the invention provides an assembly comprising an element or an embodiment thereof as described above, and an input member for connecting a source for providing a pressurized fluid to the one or more ducts or chambers of the element, wherein the assembly is configured for providing the pressurized fluid to substantially nullify an adhesion of a product to the non-stick surface of the element.

In an embodiment, the assembly further comprises a second input for connecting a vacuum source, such as a suction pump, for reducing the pressure in the one or more ducts or chambers of the element. By using a vacuum source for reducing the pressure in the one or more ducts or chamber of the element, the product can even be pulled against the outer surface for actively holding and/or fixing the product on the outer surface, for as long as the suction pump is active. When the product needs to be removed from the outer surface, the source for providing the pressurized fluid is activated to push the product away from the outer surface and activate the non-stick properties of the outer surface to provide a substantially clean removal of the product.

In an embodiment, the element is a part of a moulding device, preferably for moulding three-dimensional products from a mass of material, preferably a mass of food material, more preferably a dough material. The element of the present invention is particularly suitable for use in a moulding device. The clean removal of the product from the mould is highly advantageous. However, it is undesirable that the product falls out of the mould inadvertently due to the non-stick. The element of the present invention allows to switch the non-stick properties, which can be activated at the instant that the product must be removed from the mould.

In an embodiment, the moulding device comprises a rotatable drum, wherein the outer circumference of said rotatable drum is provided with a series of moulding cavities, wherein at least one of said moulding cavities comprises the element, wherein the non-stick surface of the element is arranged to provide an internal surface of said at least one of said moulding cavities.

In an embodiment, the moulding device comprises a disk or a plate, wherein the outer surface of said disk or plate is provided with a series of moulding cavities, wherein at least one of said moulding cavities comprises the element, wherein the non-stick surface of the element is arranged to provide an internal surface of said at least one of said moulding cavities.

In an embodiment, the element comprises a series of ducts, wherein the assembly comprises a control device for controlling the feeding of pressurized fluid to individual ducts or to a set of ducts of said series of ducts. This embodiment allows to stepwise feeding pressurised fluid to the ducts, and thus to activate the non-stick properties in a stepwise manner over the non-stick surface. Accordingly, the release of the product from the non-stick surface can be established in a stepwise manner, which allows a highly controlled release of the product from the outer surface of the element.

In an embodiment, the element is part of a cutting device, preferably wherein the non-stick surface of the element is part of a cutting blade of said cutting device. Accordingly the cutting device is provided with a non-stick surface for substantially cleanly cutting a product, in particular without leaving any residual product behind on the cutting device.

In addition, when not in use for cutting, a cleaning component, such as hot pressurized steam, can be supplied to the one or more ducts or chambers, which cleaning component is transmitted through the first layer of pervious material in order to clean or even sterilize the outer surface of the cutting device.

In an embodiment, the element is part of a storage container or a hopper, preferably wherein the non-stick surface of the element is part of an internal wall of the storage container or the hopper. In an embodiment, the element is part of a conveyor system, in particular a conveyor system comprising pipes, ducts or troughs, wherein the non-stick surface of the element is part of an internal wall of one of the pipes, ducts or troughs. By using the element of the present invention as part of a storage container, hopper or conveyor system, at least part of the internal wall of said container, hopper or conveyor system is provided with a non-stick surface, which allows to cleanly remove or transport the product out of the container or hopper, or to transport the product through the pipes, ducts or troughs of the conveyor system, substantially without leaving any residual product behind in the container, hopper or conveyor system.

In an embodiment, the element is part of a bearing, preferably wherein the non-stick surface of the element is part of an internal wall of the bearing which internal wall, in use, faces a moving member such as a rotating and/or translating shaft or shaft holding member. By providing a fluid via the one or more ducts or chambers to the non-stick surface, the friction between the internal wall of the bearing and a moving member inside the bearing can be reduced. The fluid may comprise a lubricant, preferably an oil lubricant.

Alternatively the fluid may comprises a pressurized gas to provide a low friction and/or load-bearing interface between the internal wall and the moving member. Gas-lubricated bearings are classified in two groups, depending on the source of pressurization of the gas film providing the load-carrying capacity:

Aerostatic bearings: the gas is externally-pressurized (using a compressor or a pressure tank) and injected in the clearance of the bearing via the pervious material of the first layer.

Aerodynamic bearings: the gas between the internal wall and the moving member is pressurized by the relative velocity between and/or the shape of the static and moving surfaces in the bearing. Aerodynamic bearings are self-acting and do not require an external input of compressed gas. However, when the relative velocity between the moving surface decreases, the pressure of the gas between the internal wall and the moving member decreases. By providing an Aerodynamic bearing with the element of the present invention, additional gas pressure can be provided via the pervious material of the first layer during starting or stopping of the moving member.

In an embodiment, the element is part of a boundary layer control system on a transport device, such as an aircraft, a ship or a car, wherein the element is arranged such that the outer surface of the element is part of the outer surface of the transport device. Such a boundary layer control system allows controlling the behaviour of fluid flow boundary layers at the outer surface of the transport device.

It may be desirable to reduce flow separation on fast vehicles to reduce drag. Boundary layer separation is generally undesirable in aircraft high lift coefficient systems and jet engine intakes. Laminar flow produces less skin friction than turbulent but a turbulent boundary layers are more resistant to separation.

In order to control the behavior of fluid flow boundary layers, a pressurized fluid can be introduced through the pervious material of the element into the fluid flowing around the transport device. Alternatively, or additionally the low momentum layer at the surface of the transport device can be sucked away through the pervious material of the element.

Recent developments in additive manufacturing processes, such as three-dimensional printing, have made it possible to produce elements with structures and designs which could not be produced in a conventional way. One of such newly produced elements comprises porous and solid structures which can be integrally formed using three-dimensional printing. For example, WO2017/117527A1 discloses a laser additive manufacturing process which can be used to create porous structures, solid structures, and structures which have both porous and solid portions that are integrally formed together.

According to a third aspect, the invention provides a method for producing an element with an impervious part and a pervious part as described above, wherein the pervious part is integrally formed with the impervious part, wherein the method comprises a three-dimensional printing process comprising the steps of:

providing a layer of granular material,
directing a laser beam at printing positions on or in said layer of granular material using first or second set of printer settings of said three-dimensional printer, wherein the set of printer settings of the printing process are changed from the first set of printer settings to the second set of printer settings, or vice versa, during the printing of said layer,
wherein the first set of printer settings are configured such that during said printing process, particles of said granular material are (partially) fused together to form a material wherein a space between the particles is at least partially maintained to form the pervious part, and
wherein the second set of printer settings are configured such that during said printing process, particles of said granular material are (substantially completely) fused together to form a material wherein a space between the particles of the granular material is substantially removed to form the impervious part.

The method of the present invention utilizes a method in which a laser beam is directed on or in a layer of granular material. In this application, a granular material is a conglomeration of discrete solid particles. In the layer of granular material, the particles are loosely arranged in the layer such that there is an amount of space between the particles which is sometimes called the inter-particle void volume. For the three-dimensional printing method according to the invention, the particles preferably have a size from about 1 μm to 500 μm, preferably from about 10 μm to 100 μm, more preferably from about 10 μm to 45 μm. As indicated above, the pervious part is formed by configuring the three-dimensional printer such that the space between the granular particles which are used in the three-dimensional printing process, is at least partially maintained. The size of the space between the granular particles depends, inter alia, on the size of the particles; using 'large' granular particles for printing the pervious material results in a pervious material with relatively large pores, and using 'small' granular particles for printing the pervious material results in a pervious material with relatively small pores. Accordingly, the size of the pores in the pervious material can be controlled to a certain extent, inter alia, by selecting granular particles of the right size.

In the method of the invention, the laser beam is preferably directed on or near the layer to an exposure position. At the exposure position the granular material is heated and the particles are fused together.

By carefully configuring the three dimensional printer to a first set of printer settings, the particles of said granular material are partially fused together to form a material wherein the inter-particle void volume is at least partially preserved to form a pervious or porous part. Accordingly, since the inter-particle void volume is at least partially preserved, the printed material as obtained using the first set of printer settings has a lower density than the density of the particles.

In addition, by carefully configuring the three dimensional printer to a second set of printer settings, the particles of said granular material are substantially completely fused together to form a material wherein the space between the particles of the granular material is substantially removed to form the impervious part. Accordingly, the printed material as obtained using the second set of printer settings has a high density, which may substantially be equal to the density of the particles or to a density of a solid made from the same material as the particles.

According to the invention, the printing tool is configured to change the printer settings during the printing of an element. By re-configuring the printing settings during the printing process, integrally formed pervious and impervious parts can be produced during the printing of the layer of the element. Accordingly, the present invention provides a method for integrally forming an element with low density and high density parts.

Since the pervious or porous structures are obtained by partially fusing the particles of said granular material together, fine pervious or porous structures can be manufactured with a printing tool with a large line width. In addition, with that same printing tool and with the same large line width, also impervious structures are manufactured, which are integrally formed with the pervious structures.

It is noted that the term element relates to a mechanical structure which is substantially made from the same, single material. Particularly commercially interesting are elements which are substantially made from a metallic material. Examples of such metallic materials are, Stainless Steel, Titanium, and Tantalum. However other metallic materials or alloys may also be applied. In case the metallic element is made from one and the same metallic material, it may also be referred to as a monometallic element.

In order to produce such a metallic element in a three-dimensional printing tool, a granular metal material or a metal powder is provided in a bed with a substantially flat upper side, which metal granular material is selectively melted by a laser beam at the positions where the element needs to be created. Subsequently, a new thin layer of metal granular material is provided on top of the upper side of the bed, which new thin layer is again selectively melted by the laser beam at the positions where the element needs to be created. By repeating this step, the element is built up layer by layer to produce the desired metallic element.

By changing the processing parameters during the selective melting of the metal granular material in a thin layer of said metal granular material by the laser beam, pervious and impervious parts can be produced which are arranged adjacent in the layer of metal granular material. By changing the process parameters between the processing of subsequent layers of metal granular material, pervious and impervious parts can be produced which are arranged adjacent in a direction substantially perpendicular to the layers of metal granular material. By combining these processes a three-dimensional metallic element can be manufactured comprising three-dimensional structures or volumes with a pervious part and an impervious part which are integrally formed.

It is noted that the same principle may also be applied using other types of materials, in particular synthetic or plastic materials.

It is noted that in this application, the word 'pervious' means 'able to be penetrated'.

It is further noted that the first set of printer settings are configured such that during said printing process, particles of said granular material are partially fused together to form a material wherein a space between the particles is at least partially maintained to form a material with is comparable in structure with a sintered material.

In an embodiment, the first set of printer settings is configured to obtain a pervious part in which the space between the particles in the pervious part is at least partially interconnected to allow a fluid to flow through the pervious part. Accordingly, the first set of printer settings is configured to obtain a pervious or porous part in which the inter-particle void volumes are at least partially interconnected or intercommunicating to allow a fluid to flow through the pervious or porous part. The method of the present invention can provides elements with integrally formed impervious and pervious parts, wherein the pervious parts are configured to allow a fluid to flow there through, and wherein the impervious parts preferably are configured to restrict or at least partially confine the fluid in the pervious part and/or to restrict or at least partially confine the flow of said fluid through said pervious part.

In an embodiment, the first printer settings are configured such that the pervious part comprises pores and material between pores with a thickness smaller than a spot diameter of the laser beam at the printing position. In particular, the material between adjacent pores has a minimum thickness smaller than the spot diameter of the laser beam at the printing position or smaller than the line width of the printing process.

In addition or alternatively, the invention provides a method for producing an element with at least an impervious part and a pervious part, wherein the pervious part is integrally formed with the impervious part by means of a three-dimensional printing process using a laser beam focussed to a spot diameter at a printing position, wherein parameters of the three-dimensional printing process when printing the pervious part are different from parameters of the three-dimensional printing process when printing the impervious part. Preferably, the parameters of the three-dimensional printing process when printing the pervious part are arranged such that the pervious part comprises pores and material between adjacent pores, wherein the material between adjacent pores has a minimum thickness smaller than the spot diameter of the laser beam at the printing position or smaller than the line width of the printing process.

In an embodiment, the parameters comprise an irradiation power (W) by the laser beam at the printing position, preferably wherein the irradiation power for printing the pervious part is lower than the irradiation power for printing the impervious part. Accordingly, during the three-dimensional printing process, the power of the laser beam is changed from a first value for printing impervious material to a second value for printing pervious material, or vice versa.

In an embodiment, the parameters comprise a scanning speed with which the laser beam is scanned during the three-dimensional printing process, preferably wherein the scanning speed for printing the pervious part is higher than the scanning speed for printing the impervious part. Accordingly, during the three-dimensional printing process, the scanning speed of the laser beam is changed from a first value for printing impervious material to a second value for printing pervious material, or vice versa.

In an embodiment, the parameters comprise a distance between adjacent scanning lines of the laser beam during the three-dimensional printing process, preferably wherein the distance between adjacent scanning lines for printing the pervious part is higher than the distance between adjacent scanning lines for printing the impervious part. Accordingly, during the three-dimensional printing process, the distance between adjacent scanning lines is changed from a first value for printing impervious material to a second value for printing pervious material, or vice versa.

In an embodiment, the parameters comprise a distance between a focus position of the laser beam and the printing position, preferably wherein the distance between the focus position of the laser beam and the printing position for printing the pervious part is higher than the distance between the focus position of the laser beam and the printing position for printing the impervious part. Accordingly, during the three-dimensional printing process, the distance between a focus position of the laser beam and the printing position is changed from a first value for printing impervious material to a second value for printing pervious material, or vice versa. By moving the focus position away from the printing position, the layer of granular material is arranged out of focus and the energy of the laser beam is spread over a larger area at the printing position. So in fact, the energy density at the printing position is lowered when the focus position is moved away from the printing position.

It is noted, that in the printing process of the present invention, substantially the whole area of the pervious part is irradiated by the laser beam, which irradiation results in the formation of pervious or porous material within the irradiated parts. This is completely different from the technology of creating porous structures by printing a set of repeating hollow polyhedrons with at least partially open faces as described in the prior art, wherein only the positions where struts need to be created are irradiated by the laser beam.

According to a fourth aspect, the invention provides a computer-readable medium comprising computer-executable instructions adapted to cause a three-dimensional printing tool to perform a method as described above, or to print an element as described above.

According to a fifth aspect, the invention provides a data-stream comprising computer-executable instructions adapted to cause a three-dimensional printing tool to perform a method as described above, or to print an element as described above.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

FIG. 8 is a schematic cross-section of a mould for a vacuum forming process, FIGS. 9A and 9B are schematic cross-sections of a cutting device according to the present invention, FIG. 10A shows a storage container for holding and dispensing granular material, FIG. 10B is a schematic cross-section of a part of the side wall of the storage container of FIG. 10A according to the present invention, FIG. 10C is a schematic cross-section of a part of an alternative side wall of the storage container of FIG. 10A according to the present invention.

DETAILED DESCRIPTION OF THE INVENTION

Figure 1:
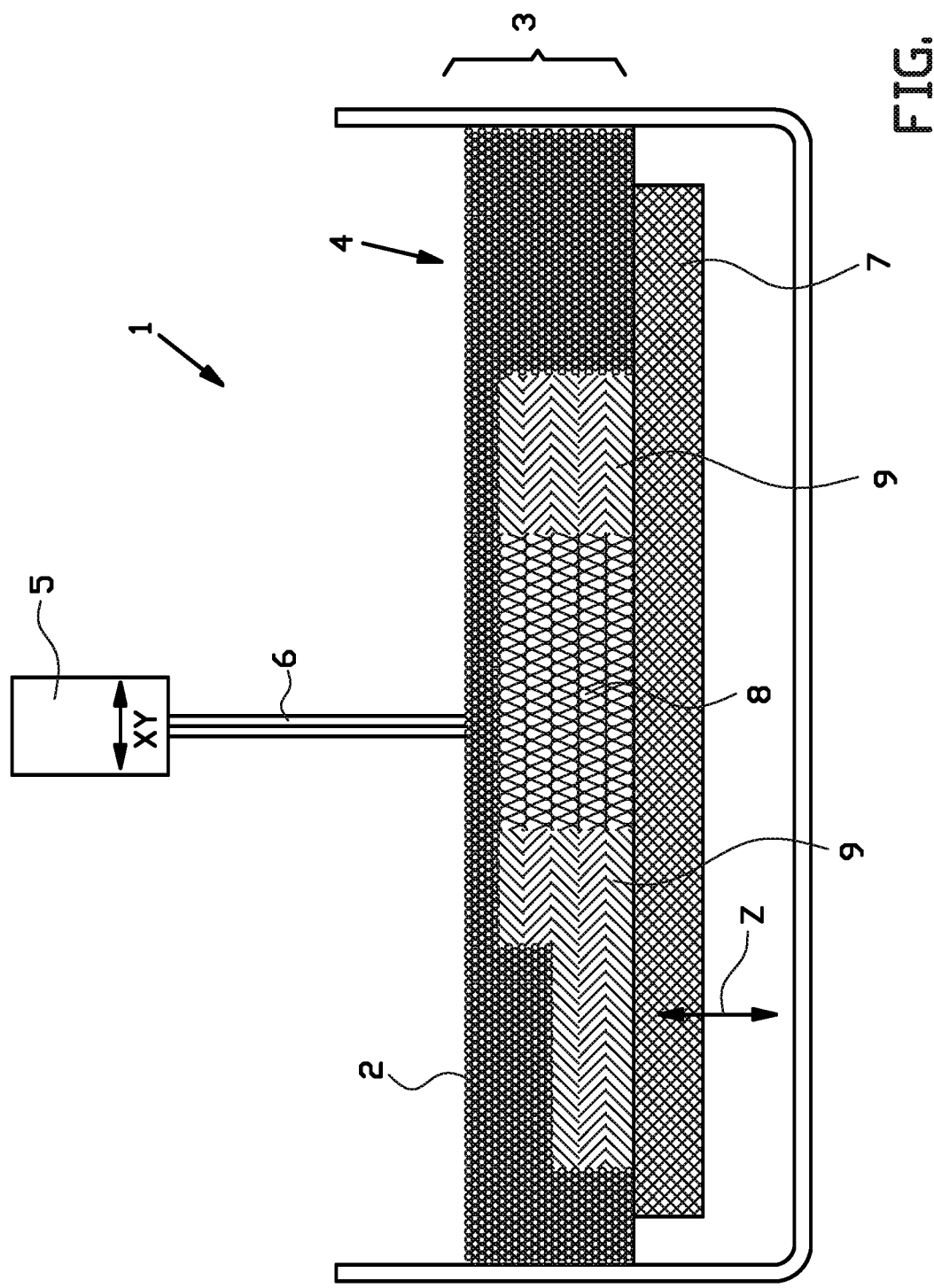
FIG. 1 is a schematic cross-section of a three-dimensional printing tool.

FIG. 1 shows a schematic cross-section of a three-dimensional printing tool 1. In order to produce an element, in particular a metallic element, of the present invention in the three-dimensional printing tool 1, a granular material 2 of the material, in particular a metal powder, is provided in a bed 3 with a substantially flat upper side 4. The granular material may for example be a Stainless Steel granular material with a grain diameter in a range of 10-65 μm.

In order to selectively melt said Stainless Steel granular material 2, the three-dimensional printing tool 1 comprises a laser 5 which produces a laser beam 6 which is focussed down to a spot size of approximately 100 micrometres, and with a substantial Gaussian intensity profile. The focus position is arranged at or near the upper side 4 of the bed 3 of metal powder.

The laser 5 and/or the laser beam 6 is scanned XY over the flat upper side 4 of the bed 3 of Stainless Steel granular material and is switched on and off in order to selectively melting the metal granular material 2 at the positions where the element needs to be created. It is noted that the laser beam 6 is moveable in a direction parallel to the direction of the cross-section, and in a direction perpendicular to the direction of the cross-section. Accordingly, the laser beam 6 can be scanned over a plane spanned by the upper side 4 of the bed 3.

As schematically shown in FIG. 1, the bed 3 of granular material 2 is arranged on top of a building platform 7. In a first step of the production process, the building platform 7 is covered by a layer of granular material 2. In a second step, the laser beam 6 is scanned over the layer to selectively expose the layer of granular material at the positions where the first layer of the element needs to be created. In a third step the building platform 7 is lowered Z and a new layer of granular material 2 is applied. By subsequently repeating the second and third steps, the element is built up layer by layer, until the element is completely printed. The completely printed element and the building platform 7 are then removed from the three-dimensional printing tool 1 and the element is separated from the building platform 7. If necessary, the element can be subjected to a posttreatment and/or a finishing process.

When using a laser power of 150 Watt, a scanning speed of 1000 mm/s, a distance between adjacent scanning lines as scanned by the laser of 0.1 mm, and positioning the upper side 4 of the bed 3 in the focus of the laser beam 6, a substantially impervious or solid Stainless Steel element can be produced. Typically, the inventor has found that when providing an energy density of approximately 70 Joule/mm$^3$ or higher to a bed of Stainless Steel powder with a grain size in a range between 10 μm and 65 μm, substantially impervious or solid Stainless Steel material is obtained. Using an energy density below 70 Joule/mm$^3$ usually yields a pervious Stainless Steel material.

However, in order to produce a non-stick surface according to the present invention fine pervious or porous regions can be obtained by changing the printer settings of the three-dimensional printing process. For example:

|  | Setting 1 | Setting 2 | Setting 3 |
| --- | --- | --- | --- |
| Laser Power [Watt] | 100 | 100 | 50 |
| Scanning velocity [mm/s] | 1000 | 1000 | 1500 |
| Out of focus [mm] | 0 | 0 | 1 |
| Distance adjacent scan-lines [mm] | 0.1 | 0.15 | 0.1 |
| Porosity | 2% | 5% | 10% | wherein the parameter 'Out of focus' represents the distance between a focus position of the laser beam 6 and the printing position at the upper surface 4 of the bed 3 of granular material 2, which parameter is '0' when the laser focus is arranged at the upper surface 4 of the bed 3. When the laser focus is moved away from the upper surface 4 and is arranged spaced apart at a distance from the upper surface 4 of the bed 3 of granular material 2, the diameter of the laser beam 6 at the upper surface 4 is increased and the Power of the laser beam 6 is spread over a larger surface area.

It is noted that the porosity as presented in this list is determined by measuring the density of the pervious metallic elements.

Preferably, the laser beam 6 is directed at printing positions on or in said layer of granular material 2 using first or second set of printer settings of said three-dimensional printer 1, wherein the set of printer settings of the printing process are changed from the first set of printer settings to the second set of printer settings, or vice versa, during the printing of said element.

The first set of printer settings are configured such that during said printing process, particles of said granular material 2 are partially fused together to form a material wherein a space between the particles is at least partially maintained to form the pervious part 8. An outer surface of said pervious part 8 provides the non-stick surface. The pores between the partially fused particles of the granular material are typically smaller than the diameter of the particles.

The second set of printer settings are configured such that during said printing process, particles of said granular material 2 are fused together to form a material wherein a space between the particles of the granular material is substantially removed to form the impervious part 9.

Using a change of the printer settings during the production of an element in a three-dimensional printing tool 1, provides a method for producing an element which comprises integrally formed pervious 8 and impervious 9 parts with highly specific and reproducible structures for many possible applications.

Figure 2:
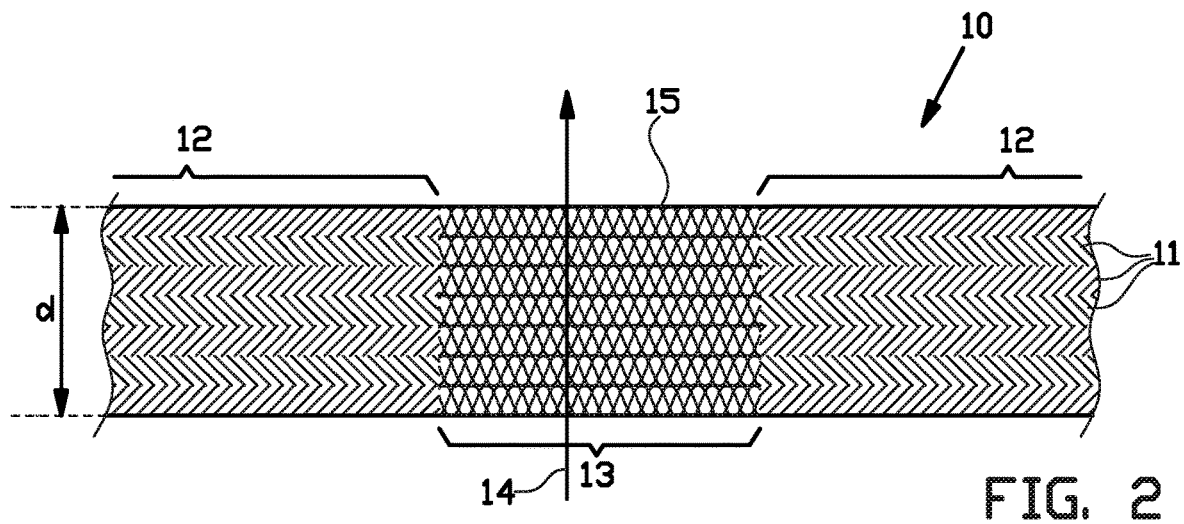
FIG. 2 is a schematic cross-section of a first example of a part of an element of the present invention.

FIG. 2 schematically shows a cross section of a part a first example of an element with both pervious and non-pervious parts. In particular, FIG. 2 shows a part of a wall 10 which is produced by subsequently printing layers 11 of a material using a three-dimensional printing tool. By changing the printer settings during the printing of each one of the layers 11, pervious parts 13 and impervious parts 12 are produced adjacent to each other. By arranging the pervious parts 13 of each layer 11 at least partially on top of each other, a pervious part 13 is obtained that extends over the whole or substantially the whole thickness d of the wall 10. The impervious parts 12 are arranged adjoining said pervious part 13 in a direction along the wall surface 15. The pervious or porous part 13 extend over the whole thickness D of the wall 10, this pervious or porous part 13 is preferably configured to allow fluids such as a liquid or a gas to pass through 14 from one side of the wall 10 to the other side. Accordingly, the pervious part 13 provides a passage for a fluid, which passage is in a direction transverse to the thickness d of the wall 10 delimited by impervious parts 12.

Figure 3:
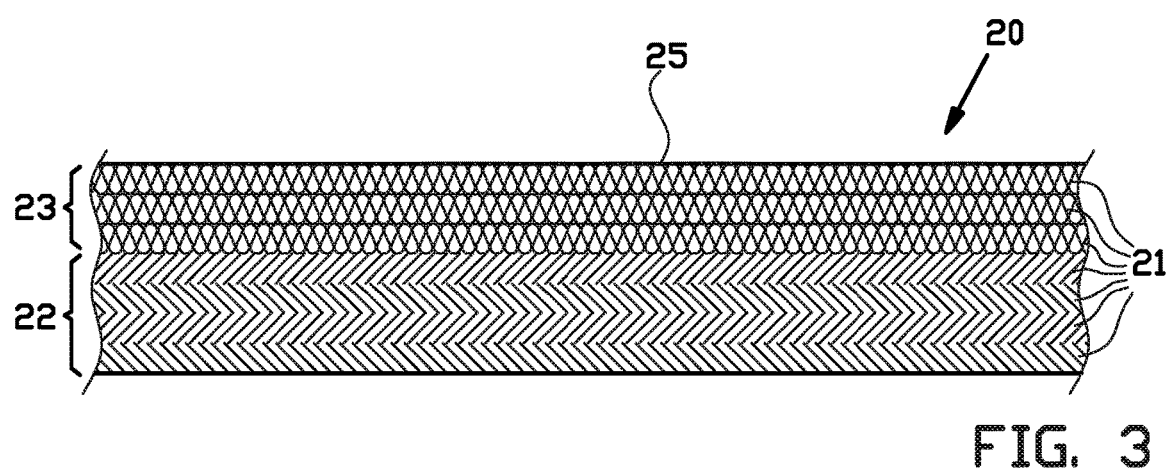
FIG. 3 is a schematic cross-section of a second example of a part of an element of the present invention.

FIG. 3 schematically shows a cross section of a part a second example of an element with pervious and impervious parts. In particular, FIG. 3 shows a part of a wall 20 which is produced by subsequently printing layers 21 of a material using a three-dimensional printing tool. By changing the processing parameters during the printing of subsequent layers 21, pervious parts 23 and impervious parts 22 are produced as a pervious or porous layer on top of or below an impervious layer. As schematically shown in FIG. 3, the pervious part 23 and the impervious part 22 are arranged adjoining in a direction substantially perpendicular to the outer wall surface 25. Accordingly, the wall 20 as a whole is impervious for fluids or gasses from one side of the wall to the other side.

Preferably, the pervious or porous layer 23 is arranged at an outer wall surface 25. In addition, the pervious part 23 is preferably configured to allow absorption of other materials. For example, the pervious part 23 is configured to provide adsorption of a lubricant, in particular a liquid lubricant, in order to provide a low friction outer surface 25. Alternatively, the pervious part 23 is configured to provide adsorption of an adhesive, in particular a liquid adhesive which at least partially penetrates the pervious part 23 and which provides a strong adhesion between the adhesive and the outer surface 25 of the wall 20.

Figure 4:
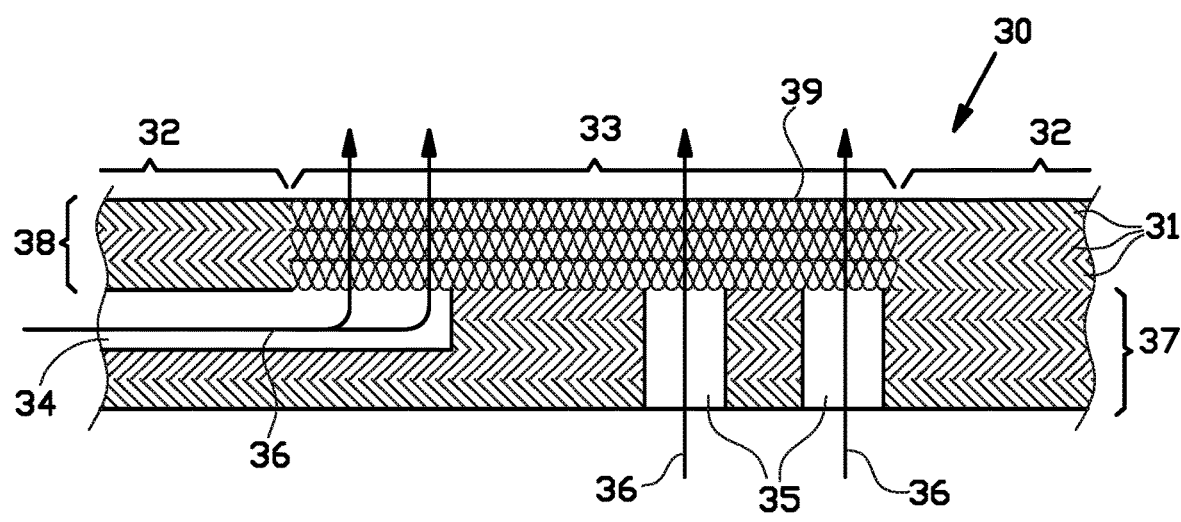
FIG. 4 is a schematic cross-section of a third example of a part of an element of the present invention.

FIG. 4 is a schematic cross-section of a third example of a part of an element with pervious and impervious part. In particular, this figure shows a part of a wall 30 which is produced by subsequently printing layers 31 of a material using a three-dimensional printing tool. By changing the printer settings during the printing of each one of the layers 31 and during the printing of subsequent layers 31, pervious parts 33 and impervious parts 32 are produced.

As schematically indicated in FIG. 4, the wall 30 comprises a first layer 37 comprising impervious material, and a second layer 38 comprising both pervious 33 and impervious 32 material. The first layer 37 and the second layer 38 extend in a direction substantially parallel to the outer wall surface 39, which outer surface 39 provides the non-stick surface. The second layer 38 is arranged to provide said outer wall surface 39. The first layer 37 is arranged at a side of said second layer 38 opposite to the outer wall surface 39.

As schematically shown in FIG. 4, the wall 30 comprises one or more ducts 34, 35 which debouche in said second layer 38 for providing a supply or drain conduit for a liquid, or a feed or exhaust conduit for a gas. In particular, the ducts 34, 35 are configured to debouche in said second layer 34 at a position spaced apart from the outer wall surface 39. The ducts 34, 35 are integrally formed with the wall 30, debouche at the interface between the first layer 37 and the second layer 38, and are at least partially arranged in said first layer 37.

As furthermore shown in FIG. 4, the duct 34 may extend inside the wall 30 in a direction substantially parallel to the outer wall surface 39. In addition or alternatively, the duct 35 may extend inside the wall 30 in a direction substantially perpendicular to the outer wall surface 39. The pervious or porous part 33 is preferably configured to allow fluids (liquids or gasses) when supplied via the ducts 34, 35, to pass through 36 said pervious part to exit said pervious part 33 at the outer wall surface 39. Alternatively, the pervious or porous part 33 is configured to allow to drain or extract fluids from the said pervious part 33 via the ducts 34, 35, or to drain or extract fluids from the space adjacent to the outer wall surface 39 via the pervious or porous part 33 and the ducts 34, 35.

It is noted that the exemplary elements of FIGS. 2, 3 and 4 are preferably metallic elements, more preferably monometallic elements, which can be manufactured from, for example, Stainless Steel using the three-dimensional printing tool 1 and the printer settings as described above.

Figure 5:
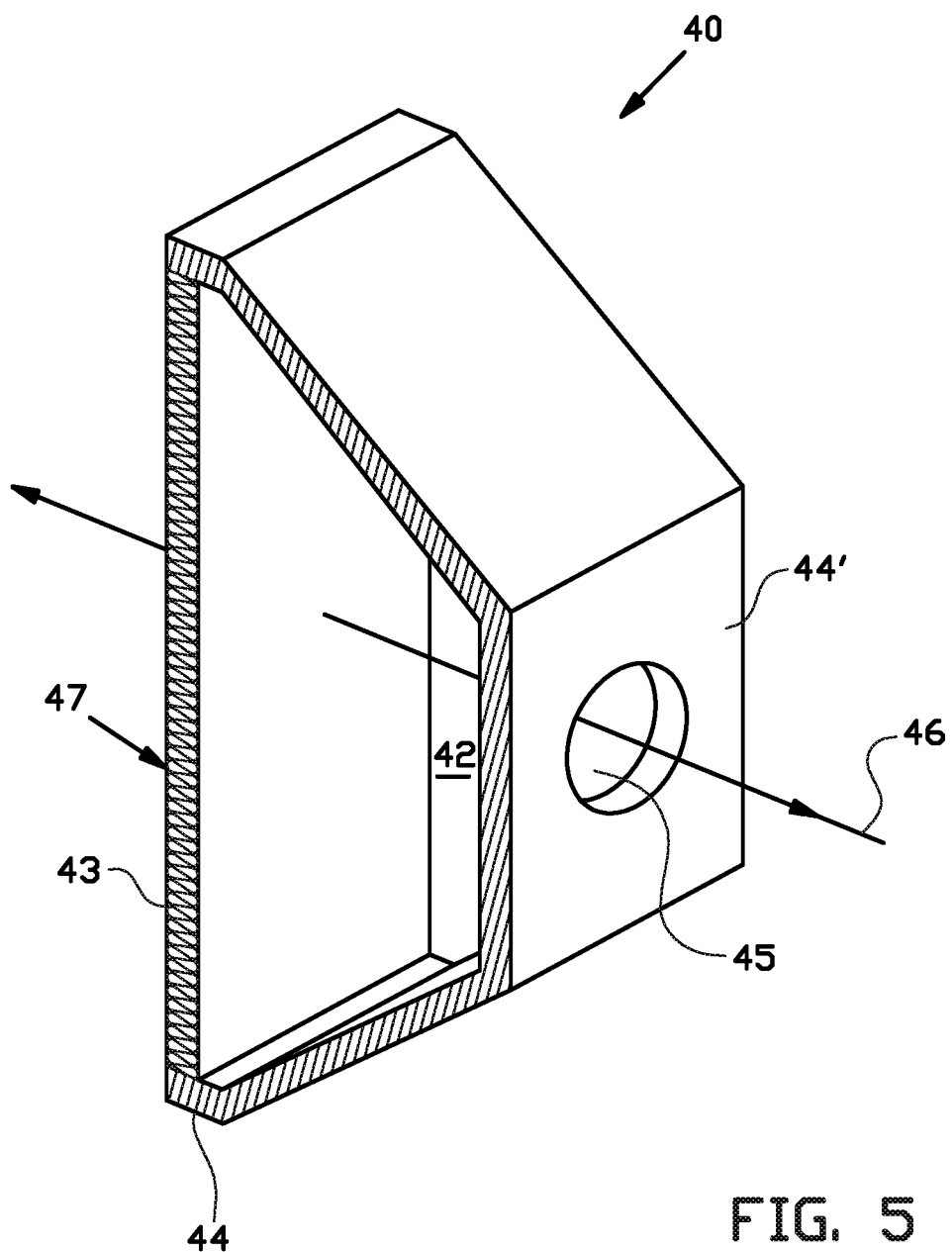
FIG. 5 is a schematic cross-section of a fourth example of an element of the present invention.

A more elaborate fourth example of a metallic element of the present invention is shown in FIG. 5. In particular, FIG. 5 shows a schematic cross-section of a metallic element 40 according to the present invention. The metallic element 40 comprises impervious walls 44, 44' and a pervious wall 43, which walls 44, 44', 43 enclose a chamber 42. In the impervious wall 44' opposite the pervious wall 43, an opening 45 is provided, which opening 45 can be connected to a fluid supply or to a fluid pump device (not shown). The metallic element 40 is preferably integrally formed using a three-dimensional printing tool, and can be used for many different applications, for example:

a. The pervious wall 43 can be utilized as a non-stick surface for substantially cleanly removing a product which was arranged against the outer face 47 of the previous wall 43. The opening 45 is in this case connected to an air supply to provide pressurised air inside the chamber 42. The pressurised air is transmitted through the pervious wall 43 and acts on a product which is placed against or onto the outer face 47 of the previous wall 43. When the product needs to be removed, the chamber 42 is pressurised, and the pressurised air pushes the product away from the outer face 47 of the pervious wall 43, which can provide a substantially clean removal of the product, substantially without leaving any residual product behind on the outer face 47.

b. The pervious wall 43 can also be utilized as a suction area for holding a product, preferably a substantially flat product. The opening 45 is than connected to a vacuum pump in order to reduce the air pressure inside the chamber 42. The reduced air pressure inside the chamber 42 is transmitted by the pervious wall 43 and acts on a product which is placed against the pervious wall 43. Accordingly, the outer face 47 of the pervious wall 43 acts as a suction area to hold the product against the pervious wall 43.

c. The outer face 47 of the pervious wall 43 can also be utilized as a cleaning surface, for example for cleaning components or an assembly for the food industry. The opening 45 can be connected to a supply for a pressurised cleaning agent, such as hot pressurised steam. The steam is transmitted through the pervious wall 43 which is arranged near to or adjacent the components or assembly which needs to be cleaned, so that the steam coming out of the outer surface 47 of the pervious wall 43 can perform a cleaning action on the components or assembly.

d. The pervious wall 43 can also be a part of a wall between moving parts of a bearing. The opening 45 is preferably connected to a supply for a lubricant. The lubricant, as supplied to the chamber 42, is transmitted through the pervious wall 43 to provide lubrication to the outer face 47 of the pervious wall 43 to reduce friction between the moving parts.

It is to be understood that the above examples a, b, c and d are included to illustrate the operation of the fourth example and are not meant to limit the scope of the example according to the invention.

Figure 6A:
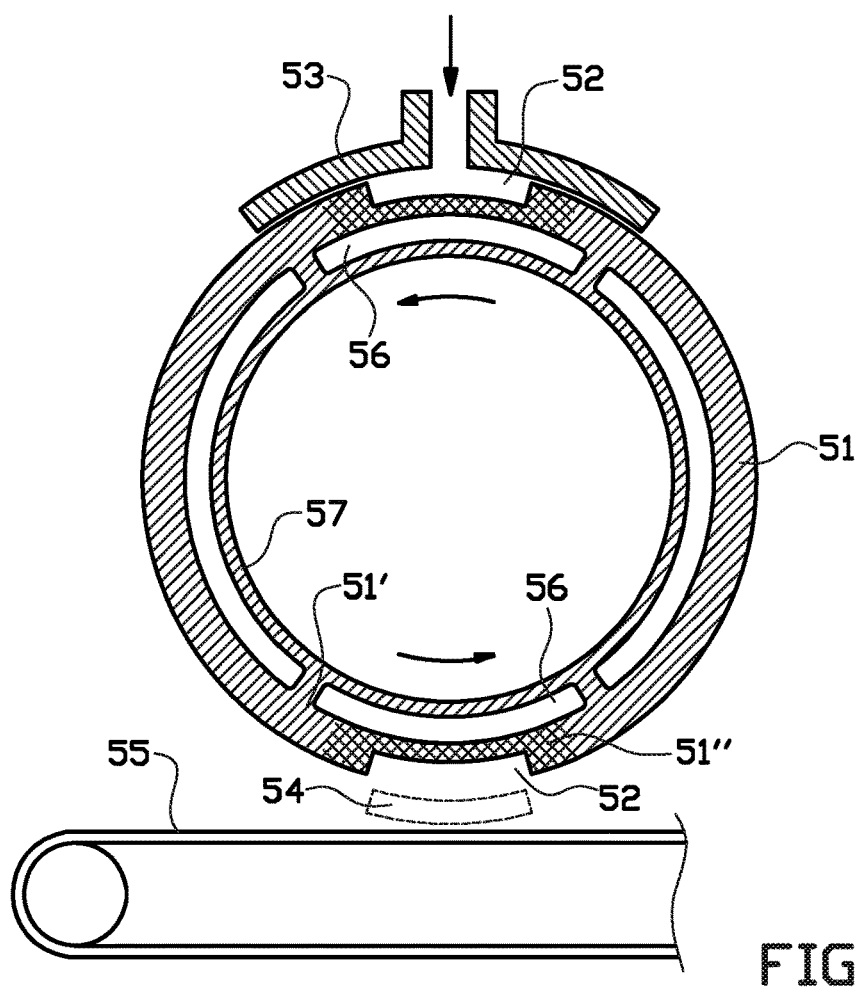
FIG. 6A is a schematic cross-section of a part of a moulding device for moulding three-dimensional products from a mass of material device comprising an element of the present invention.

FIG. 6A schematically shows a part of a moulding device for moulding three-dimensional products from a mass of material, for example a mass of foodstuff starting material, such as dough mass for the manufacturing of cookies for example. The moulding device comprises a rotatable drum 51 which is driven by an associated drive motor (not shown). The outer circumference of said rotatable drum 51 is provided with a series of moulding cavities 52 which define the shape of the products which are to be produced. Adjacent to the drum 51, a filling device 53 is arranged, which fills the mould cavities 52 which move past the filling device 53 with the mass. The products 54 arranged in the cavities 52 are removed from the cavity in questions at a release position located downstream the filling device 53, and fall onto a conveyor device 55 for transporting the products 54 away from the moulding device.

In order to assist in the removal of the products 54 from a cavity 52, the wall of the drum 51 at the cavities 52 is made from a pervious material 51" which is permeable for a fluid, such as pressurized air, while at least the part of the drum 51 surrounding the cavity 52 is made from an impervious material 51'. According to the present invention, the pervious material 51" is made using particles of granular material which are fused together to form a material wherein a space between the particles is at least partially maintained and is at least partially interconnected to allow a fluid to flow through the pervious material 51". In the impervious material 51', particles of said granular material are substantially completely fused together to form a material wherein a space between the particles of the granular material is substantially removed. When the product 54 needs to be removed from the moulding cavity 52, the chamber or duct 56 is pressurised, and the pressurised air pushes the product 54 away from the outer surface of the pervious wall 51", which provide a substantially clean removal of the product 54, substantially without leaving any residual product behind in the moulding cavity 52. Accordingly the moulding cavity 52 is provided with a non-stick surface according to the present invention.

It is noted that in the example shown in FIG. 6A the impervious parts 51 and the pervious parts 51" of the moulding device are integrally formed, preferably by means of fusing particle of a granular material in a three-dimensional printing process.

Figure 6B:
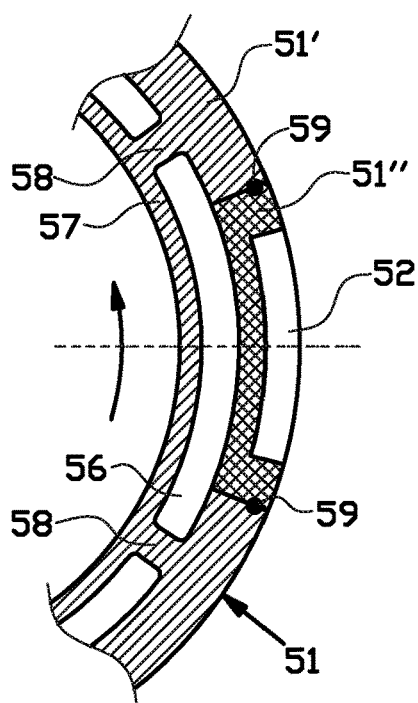
FIG. 6B is an enlarged view of an first alternative part of a moulding device of FIG. 6A.

FIG. 6B schematically shows an enlarged view of a part of an alternative example of a moulding device. In this alternative example, the pervious part 51" is separately manufactured, preferably using a three-dimensional printing process. The impervious part 51' of the moulding device can be manufactured using conventional methods or also using a three-dimensional printing process. The pervious part 51" is inserted in the impervious part 51' to provide the moulding device. Preferably, a seal 59 such as an 'O'-ring is provided between the pervious part 51" and the impervious part 51', as schematically shown in FIG. 6B.

In both the example shown in FIGS. 6A and 6B, the pervious part 51" extends over the whole or substantially the whole wall thickness of the outer wall at the moulding cavity 52, and the impervious part 51' is arranged adjoining said pervious part 51" in a direction along the outer wall surface of the drum 51.

The pervious material 51" is provided with pores having a diameter which is generally smaller than the diameter of the granular material used for producing the pervious material 51". When using granular material comprising particles with a diameter in a range from 10 to 65 μm, the pores in the pervious material 51" are large enough to allow a gas, such as pressurized air, to flow through the pervious material 51", and are small enough such that the mass of material substantially does not penetrate into the pores of the pervious material 51".

At the inner side of the drum 51, adjacent to the pervious material 51", a duct 56 is provided. The duct 56 in this example is formed by an inner concentric wall 57 and two radial walls 58 which connect the inner concentric wall 57 to the outer wall of the drum 51. The outer wall of the drum 51 (except for the pervious part at the cavity 52), the inner concentric wall 57 and the two radial walls 58 are integrally formed by means of a three-dimensional printing method and are made to comprise impervious material 51' so that the duct 56 is configured for guiding a gas through the duct 56 in a substantial longitudinal direction of the drum 51. Accordingly, a pressurised fluid can be fed to the duct 56, which fluid is distributed over the pervious material 51" of the moulding cavity 52 associated with said duct 56, and a through-flow of the fluid through the pervious material 51" can exert a force to a product in the moulding cavity 52 such that the product 54 is removed out of the moulding cavity 52, preferably when the moulding cavity 52 is facing the conveyor device 55. In addition or alternatively, the duct 56 can be connected to a vacuum source, such as a suction pump, which, when in operation, reduces the pressure in the duct 56 due to which air is sucked out of the moulding cavity 52 via the pervious material 51". This suction action can be used to assist the filling of the moulding cavity 52 at the filling device 53.

Figure 7:
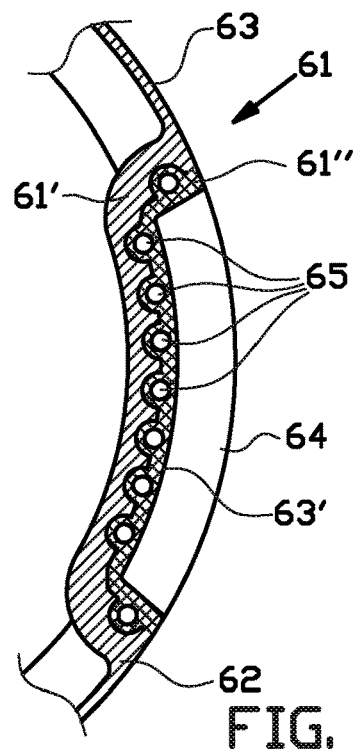
FIG. 7 is an enlarged view of a part of a second alternative part of a moulding device of FIG. 6A.

FIG. 7 shows a schematic cross-section view of a part of an alternative example of a drum 61 for a moulding device as discussed above with reference to FIGS. 6A and 6B. In this example, the drum 61 comprises a wall 62 having an outer wall surface 63, wherein the pervious part 61" and said impervious part 61' are arranged adjoining in a direction substantially perpendicular to said outer wall surface 63. In particular, at the moulding cavity 64, said pervious part 61" comprises a first layer and said impervious part 61' comprises a second layer, wherein said first layer and said second layer extend in a direction substantially parallel to the outer wall surface 63. The first layer comprising pervious material is arranged to at least partially provide said outer wall surface 63' in the moulding cavity 64. The second layer comprising impervious material is arranged at a side of said second layer opposite to the outer wall surface 63. As schematically shown in FIG. 7, the first layer comprising the pervious part 61" also comprises a series of ducts 65. The ducts 65 are embedded in the pervious part 61" and debouch in the pervious part 61". A pressurised fluid can be fed to the ducts 65, which fluid is distributed over the pervious material 61" of the moulding cavity 64, and a through-flow of the fluid through the pervious material 61" can exert a force to a product in the moulding cavity 64 to provide the non-stick properties of the outer wall surface 63 to assist in the removal of a product in the moulding cavity 64. In addition or alternatively, the ducts 65 can be connected to a vacuum source which, when in operation, reduces the pressure in the ducts 65 due to which air is sucked out of the moulding cavity 64 via the pervious material 61". This suction action can be used to assist the filling of the moulding cavity 64. Preferably, the drum 61 with said impervious part 61', pervious part 61" and embedded ducts 65, is integrally formed by means of a three-dimensional printing process, for example as described above with reference to FIG. 1.

It is noted that the series of ducts 65 can be configured to be control the feeding of pressurised fluid to individual ducts or to a set of ducts of said series of ducts 65. For example, by a stepwise feeding pressurised fluid to the ducts 65 a stepwise release of the product out of the moulding cavity 64 can be established:
- in a first step; feeding pressurised fluid to the ducts adjacent to a first edge of the moulding cavity 64,
- in a second step; feeding pressurised fluid to the ducts in the centre of the cavity 64, and
- in a third step; feeding pressurised fluid to the ducts adjacent to a second edge of the moulding cavity 64, which second edge is opposite to the first edge in rotation direction of the drum 61.

It is further noted that in the example shown in FIGS. 6A and 7, the whole drum with the pervious and impervious part are preferably integrally formed by means of a three-dimensional printing process. However, the drum can also be provided with an insert which comprises the moulding cavity, and this insert comprises at least said pervious part, as schematically shown in FIG. 6B, which is preferably formed by means of a three-dimensional printing process.

It is further noted that the moulding devices as schematically shown in FIGS. 6A, 6B and 7 are drum shaped moulding devices. However, the moulding device may also be provided in the shape of a disk or a plate, wherein the outer surface of said disk or plate is provided with a series of moulding cavities, wherein at least one of said moulding cavities comprises the element with the non-stick surface, wherein the non-stick surface of the element is arranged to provide an internal surface of said at least one of said moulding cavities.

FIG. 8 is a schematic cross-section of a mould 91 for a vacuum forming process. Vacuum forming is a process wherein a material, such as a sheet of plastic, is heated to a forming temperature, stretched onto the mould 91 and forced against the mould by a vacuum. The mould 91 comprises a wall having an outer wall part 92 and an inner wall part 93, wherein the surface of the inner wall part 93 provides the moulding surface. The inner wall part 93 comprises a pervious material and the outer wall part 92 comprises an impervious material according to the present invention.

As schematically shown in FIG. 8, a series of ducts 94 are embedded in the pervious material of the inner wall part 93. During the vacuum forming process, the ducts 94 are connected to a reduced-pressure means, such as a vacuum pump, and the air can be sucked out of the mould via the pervious material of the inner wall part 93 and the ducts 94. Accordingly the material to be formed is forced against the inner wall part 93 and shaped according the shape of the surface of the inner wall part 93. After the material has been formed and shaped in the mould 91, the shaped material is taken out of the mould 91.

To assist the release of the shaped material from the mould 91, the ducts 94 are connected to a source of pressurised fluid, which pressurised fluid flows through the pervious material of the inner wall part 93, which fluid pushed the shaped material away from the inner wall part 93 of the mould 91. In addition or alternatively, the mould 91 is provided with a dedicated blow-out channel 95, which in use is connected to a source of pressurised fluid.

The outer wall part 92 is made by impervious material in order to restrict the reduction of the pressure to the inner wall part 93 of the mould 91.

Preferably, the mould 91 with said inner wall part 93 with pervious material, said outer wall part 92 with impervious material, and embedded ducts 94 and blow-out channel 95, is integrally formed by means of a three-dimensional printing process, for example as described above with reference to FIG. 1.

FIGS. 9A and 9B are schematic cross-sections of a cutting device according to the present invention. The cutting device 111 comprises a cutting blade 112 which is made of pervious or porous material. The cutting blade 112 comprises an internal chamber 113 which arranged in said porous material and which chamber 113 is arranged in fluid connection with the porous material of the cutting blade 112. For structural integrity the chamber 113 is bridged by several strengthening elements 112' which may be made from pervious material or from impervious material.

The cutting blade 112 of this example comprises an upper rim 114 of an impervious or solid material to provide additional strength to the cutting blade 112. The part 115 of the cutting blade 112 adjacent to the handle 117 also comprises impervious or solid material and is provided with an input opening 116 for providing a pressurized fluid to the chamber 113. Furthermore, the handle 117 is provided with a duct 118 which provided with a connecting member 119 for connecting a source of pressurized fluid to the cutting device 111. The connecting member 119 is arranged to an end of the handle 117 opposite to the cutting blade 112.

In use the connecting member 119 is connected to a source of pressurized fluid for providing the pressurized fluid to the porous material of the cutting blade 112 to substantially nullify an adhesion of a product to the non-stick surface of the cutting blade 112.

FIG. 10A shows another example of a storage container 161 for holding and dispensing granular material 160. The storage container 161 comprises a funnel shaped bottom part 162 with a centrally arranged dispensing opening 163. In order to ascertain a substantially continues outflow of the granular material 160 out of the dispensing opening 163, the storage container 161 is provided with elements 164 which are arranged with their non-stick surface facing the inside of the storage container 161.

A first example of such a element 164' is shown in the detailed view of FIG. 10B. As shown in FIG. 10B, the storage container comprises a circumferential side wall 165'. The circumferential side wall 165' comprises an outer wall 166' which is made from an impervious material, and an inner wall 167' which is made from a pervious material. Between the outer wall 166' and the inner wall 167' an array of support members 168' are arranged. The hollow space 169' is provided between the inner wall 167' and the outer wall 166' which is connected to an input for introducing a pressurised fluid into the hollow space 169'. The pressurised fluid can flow through the pervious material of the inner wall 167'. In use, the pressurized fluid is introduced into the storage container via the inner wall 167', which increases the flow-ability of any granular material along the inner wall 167' of the storage container.

In addition, when the flow of fluid through the inner wall 167' is high enough, the granular material in the storage container, at least the part of the granular material arranged adjacent or near the inner wall 167', may be fluidized and will exhibit a substantially fluid behaviour.

Preferably, the circumferential side wall 165', with the pervious inner wall 167', the impervious outer wall 166' and the array of support member 168', are integrally formed by means of a three-dimensional printing process for example as described above with reference to FIG. 1.

The method according to the present invention, allows to make the circumferential side wall 165' more compact, as schematically shown in FIG. 10C. In the cross section of a second example as shown in FIG. 10C, the circumferential wall 165" comprises an outer wall part 166" comprising impervious material, and an inner wall part 167" comprising pervious material. The inner wall part 167" is arranged at the inside of the storage container. In addition the circumferential side wall 165" is provided with an array of ducts 169", which are integrally formed with the circumferential side wall 165", and which are arranged in the inner wall part 167" with the pervious material. The ducts 169" are connected to an input for introducing a pressurised fluid into the ducts 169", which pressurised fluid can flow through the ducts 169" and then through the pervious material of the inner wall part 167" into the storage container. In use, the pressurized fluid is introduced into the storage container via the ducts 167", which increases the flow-ability of any granular material along the inner wall 167" of the storage container.

Preferably, the circumferential side wall 165" with the inner wall part 167", the outer wall part 166" and the array of ducts 169", are integrally formed by means of a three-dimensional printing process for example as described above with reference to FIG. 1.

Figure 11A:
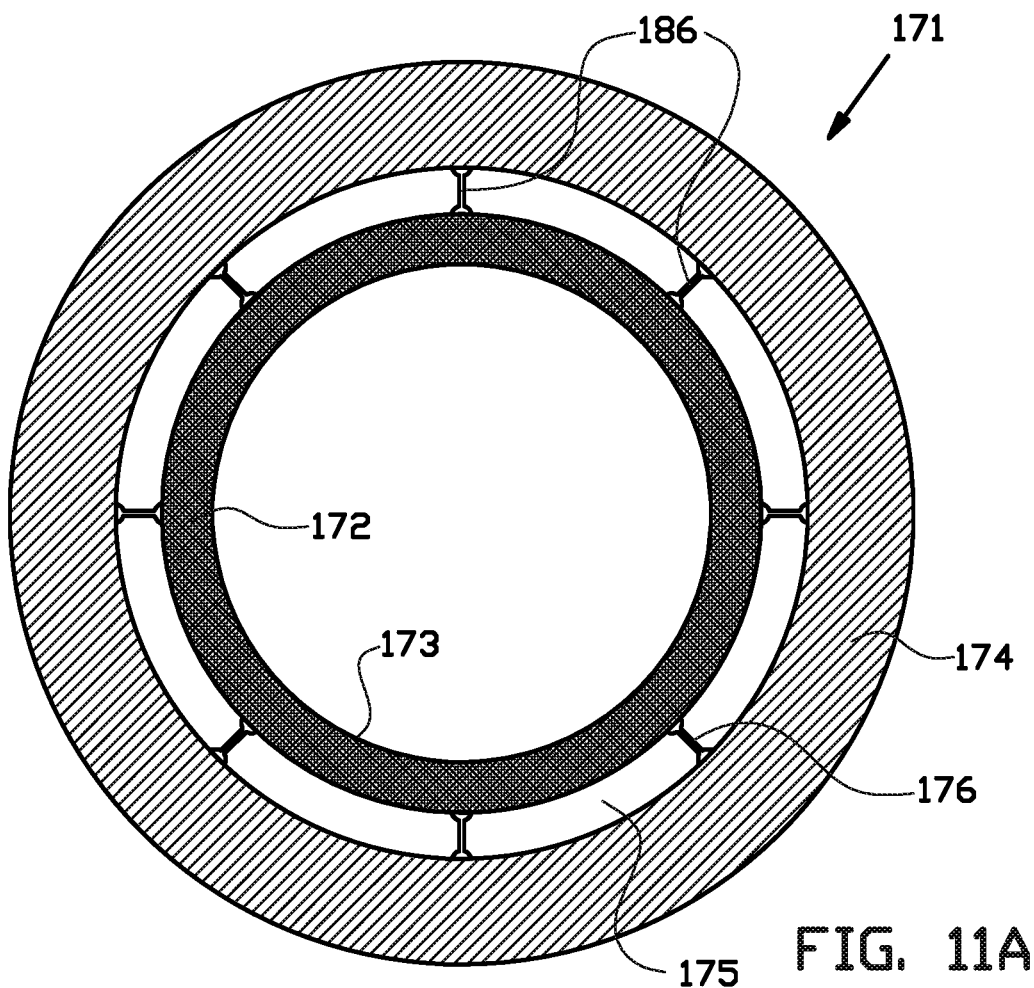
FIG. 11A is a schematic cross-section of a transport tube with an wall according to the present invention.

FIG. 11A is a schematic cross-section of a transport tube 171 with an wall according to the present invention. The transport tube 171 comprises a first layer 172 of an pervious or porous material, which is configured to allow a fluid to flow there through. An outer surface 173 of said first layer, which in this examples is arranged facing the inside of the transport tube 171, provides the non-stick surface. The transport tube 171 comprises a second layer 174 of an impervious or solid material, which is configured to substantially surround the first layer at a side facing the outside of the transport tube 171. The second layer 174 is arranged block a flow of fluid there through. In between the first layer 172 and the second layer 174, the transport tube 171 comprises ducts or chambers 175. Said ducts or chambers 175 are arranged in fluid connection with said pervious material of the first layer 172 and are configured for feeding a pressurized fluid to the pervious material, to reduce any friction between the non-stick surface 173 inside the tube and any product transported through said tube 171.

For structural integrity the chamber 175 is bridged by several strengthening elements 176 which may be made from pervious material or from impervious material, which interconnect the first layer 172 and the second layer 174.

Figure 11B:
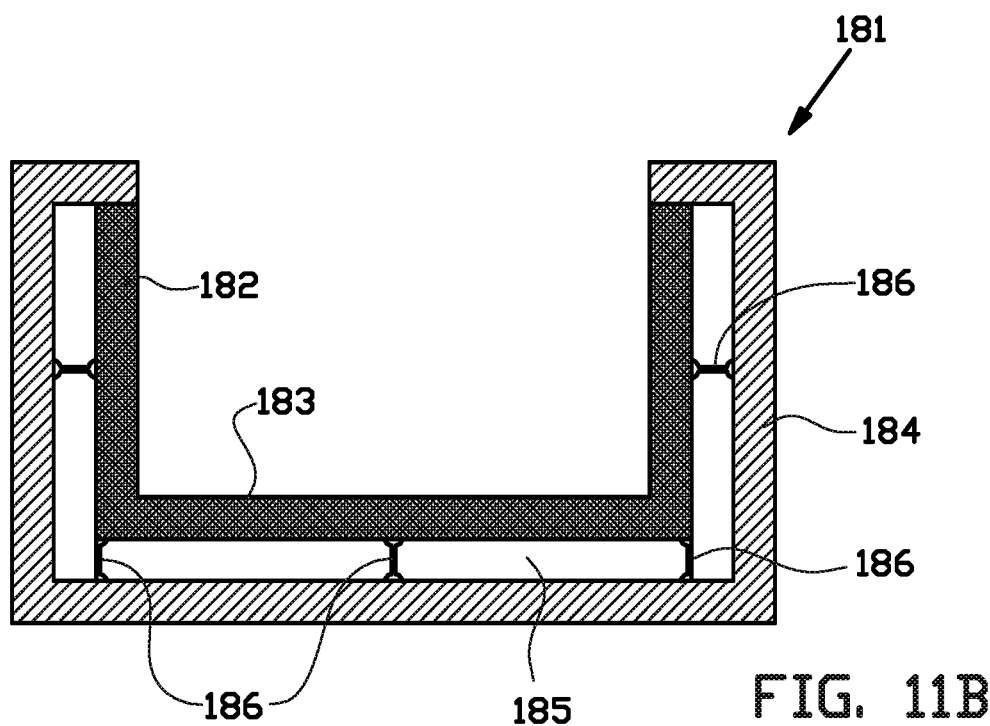
FIG. 11B is a schematic cross-section of a transport trough with a wall according to the present invention.

FIG. 11B is a schematic cross-section of a transport trough 181 with a wall according to the present invention. The transport trough 181 comprises a first layer 182 of an pervious or porous material, which is configured to allow a fluid to flow there through. An outer surface 183 of said first layer, which in this examples is arranged facing the inside of the transport trough 181, provides the non-stick surface. The transport trough 181 comprises a second layer 184 of an impervious or solid material, which is configured to substantially surround the first layer at a side facing the outside of the transport trough 181. The second layer 184 is arranged block a flow of fluid there through. In between the first layer 182 and the second layer 184, the transport trough 181 comprises ducts or chambers 185. Said ducts or chambers 185 are arranged in fluid connection with said pervious material of the first layer 182 and are configured for feeding a pressurized fluid to the pervious material, to reduce any friction between the non-stick surface 183 inside the trough and any product transported through said trough 181.

For structural integrity the chamber 185 is bridged by several strengthening elements 186 which may be made from pervious material or from impervious material, which interconnect the first layer 182 and the second layer 184.

Figures 12A, 12B:
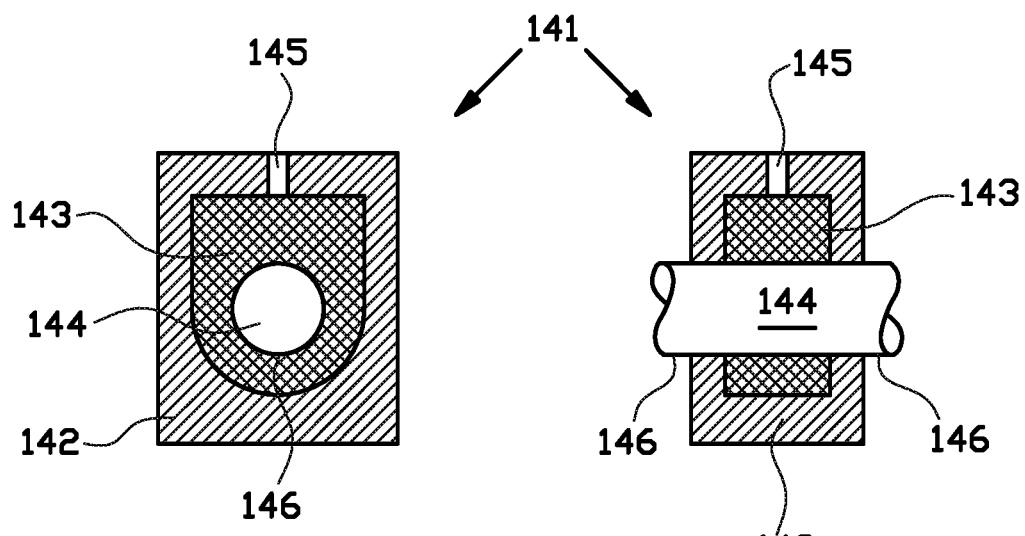
FIGS. 12A and 12B are schematic cross-sections of a bearing comprising a bearing housing of an impervious material and an internal wall of a pervious material according to the present invention.

FIGS. 12A and 12B show schematic cross-sections of a bearing 141 comprising a bearing housing 142, a lubricant holding member 143, and a shaft 144 arranged in an opening in the bearing 141. The side of the opening facing the shaft 144 defines a bearing surface 146.

It is known to use porous bronze or iron alloy materials which are impregnated with an oil lubricant as a lubricant providing member in bearings. Such materials are also known as Oilite.

In the bearing of the present invention, the bearing housing 142 and the lubricant holding member 143 are integrally formed by means of a three-dimensional printing process for example as described above with reference to FIG. 1. In particular the bearing housing 142 is substantially made form impervious material, whereas the lubricant holding member 143 comprises a pervious material. In particular, the bearing housing 142 and the lubricant holding member 143 are made from substantially the same basic material, which basic material is printed as impervious material at the position of the bearing housing 142 and is printed as pervious material at the position of the lubricant holding member 143. In an embodiment of the present invention, the bearing housing 142 and the lubricant holding member 143 are made from stainless steel. The pervious or porous lubricant holding member 143 can be vacuum impregnated with a lubricant, such as oil, to improve the materials bearing ability. In addition or alternatively, a lubricant can be provided to the lubricant holding member 143 via a grease fitting 145 in the bearing housing 142.

It is noted that instead of using an oil lubricant, the fitting 145 can also be connected to a source for pressurized gas, which gas acts as lubricant and is distributed around the shaft 144 by the lubricant holding member 143, to form an air bearing.

Figure 13:
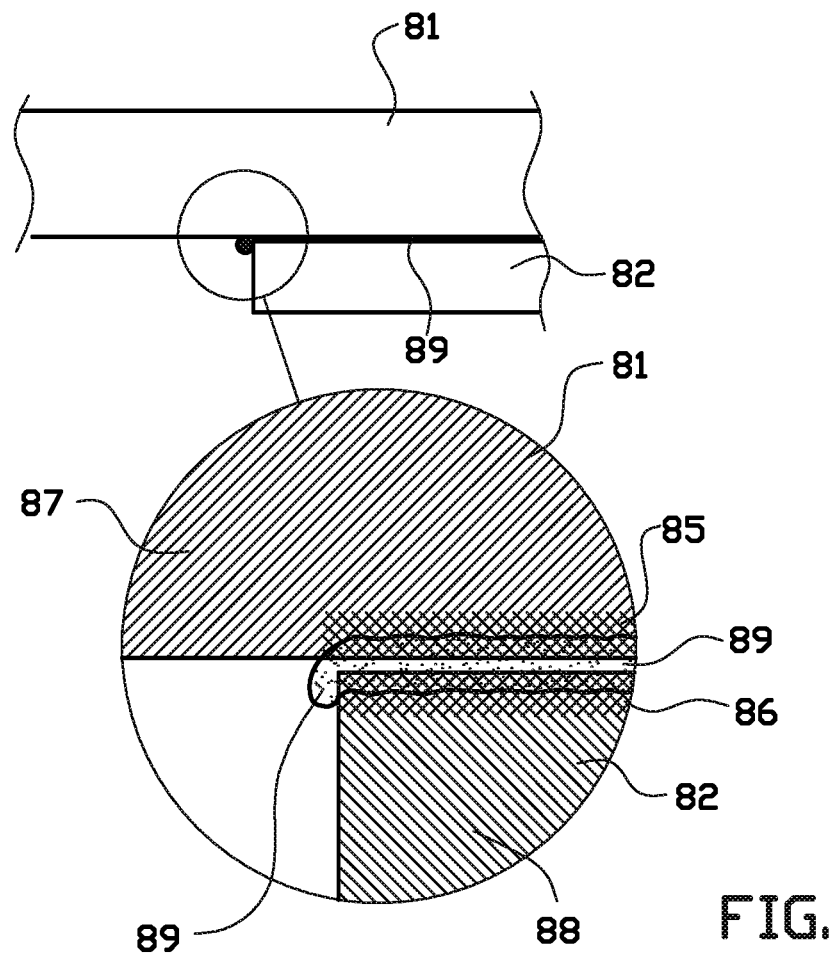
FIG. 13 is a schematic cross-section of a glue connection comprising at least one element according to the present invention.

FIG. 13 is a schematic cross-section of a glue connection comprising at least one element with a porous surface layer. More in particular, FIG. 13 shows a first planar element 81 and a second planar element 82 which are interconnected by a glue connection. As schematically shown in the enlarged view in FIG. 13, at least a part of the outer surface of the first planar element 81 comprises a pervious part 85. The remaining part of the first planar element 81 is made from as impervious material 87. Furthermore, at least a part of the outer surface of the second planar element 82 comprises a pervious part 86. The remaining part of the second element 82 is made from as impervious material 88.

In particular the pervious parts 85, 86 are arranged to at least partially cover the surfaces where the first planar element 81 and the second planar element are to be glued together. The pervious part 85 of the first planar element 81 faces the pervious part 86 of the second planar element 82. Accordingly, when a glue 89 is introduced in-between the first and second planar elements, this glue 89 at least partially penetrates into the pervious parts 85, 86 and bridges the gap between the first and second planar elements 81, 82, and provides a firm interconnection between the first and second planar elements 81, 82. In particular, since the glue 89 is at least partially arranged in the pervious parts 85, 86 a much stronger connection between the first element 81 and the second element 82 is obtained compared with the situation when the first and second planar elements are not provided with pervious parts. In addition or alternatively the peel strength between the first and second planar elements according to the invention is much higher, when compared to a glue connection between a two planar elements without the pervious parts.

Preferably, the impervious part 87 and the pervious part 85 of the first planar element 81 are integrally formed by means of a three-dimensional printing process, for example as described above with reference to FIG. 1. Also the impervious part 88 and the pervious part 86 of the second planar element 82 are integrally formed by means of a three-dimensional printing process.

Figure 14:
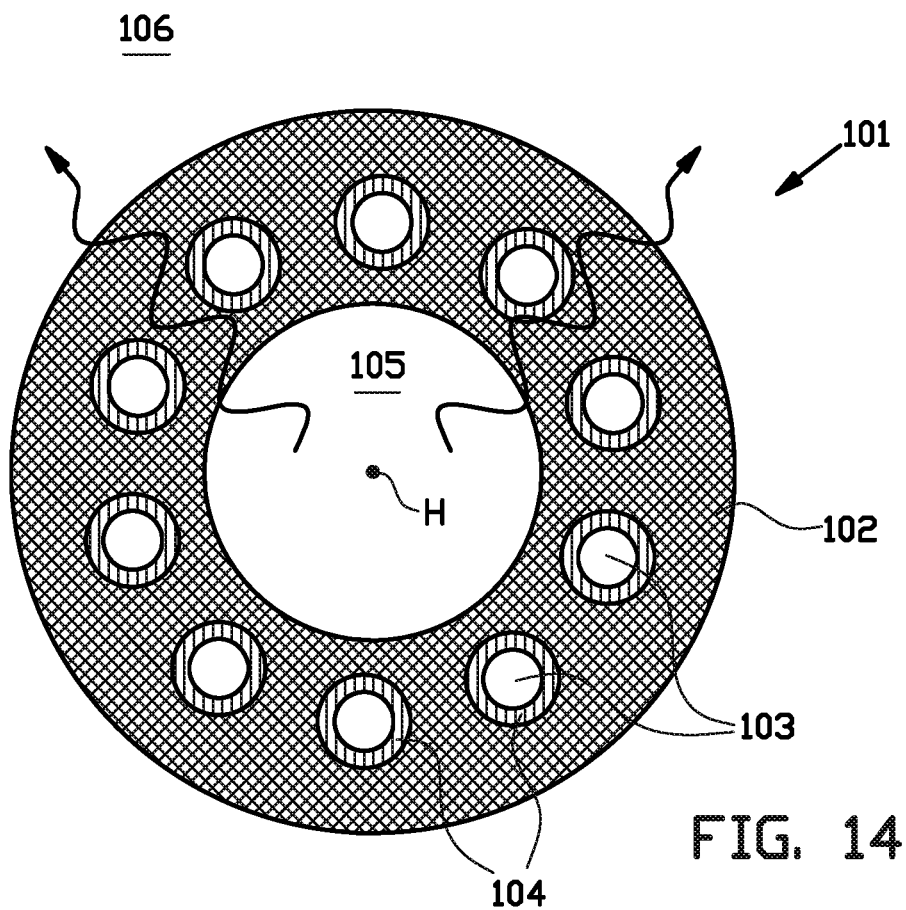
FIG. 14 is a schematic cross-section of a heat exchanger according to the present invention.

A further example is schematically shown in FIG. 14. FIG. 14 shows a schematic cross-section of a heat exchanger 101 for transferring heat between a first and a second fluid. The heat exchanger 101 comprises a main body 102 which is formed as a substantially round tube which extends in a direction along a centre line h (the shown cross-section extends substantially perpendicular to said centre line h). The main body 102 comprises a pervious material which allows a first fluid to pass from the inside 105 of the main body 102 to the outside 106 of the main body 102, or vice versa.

Imbedded in the wall of the main body 102 is a series of secondary tubes 103 having a surrounding wall 104 made from an impervious material. The secondary tubes 103 are configured to allow a second fluid to travel through said secondary tubes 103. The surrounding wall 104 of the secondary tubes 103 is impervious in order to prevent mixing of the first and second fluid.

Preferably, the main body 102 with said wall of pervious material, the secondary tubes 103 with said walls 104 of impervious material, is integrally formed by means of a three-dimensional printing process for example as described above with reference to FIG. 1 and using a heat conducting material, such as a metal powder.

Figure 15A:
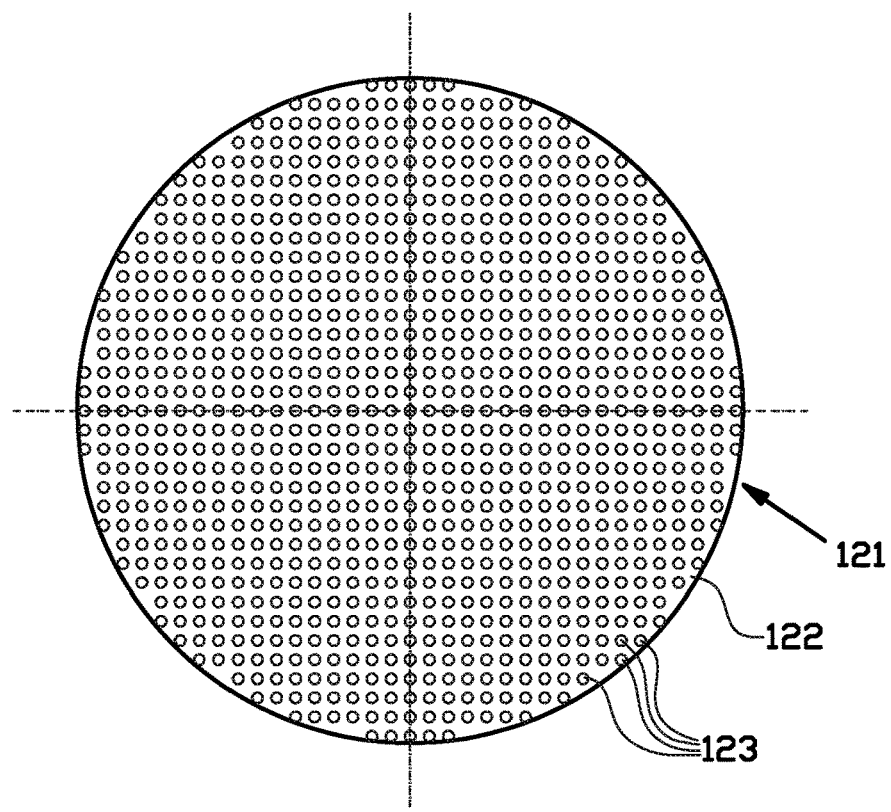
FIG. 15A is a schematic view of a part of an outside wall of a transport device which outside wall is provided with an array of through openings, for example, for boundary layer control.

FIG. 15A is a schematic view of a part of an outside wall 121 of a transport device which outside wall 121 is provided with an array of through openings 123 in the surface 122 of the outside wall 121, for example, for boundary layer control. Although the array of through openings 123 may provide adequate boundary layer control, the through openings 123 may become clogged.

Figure 15B:
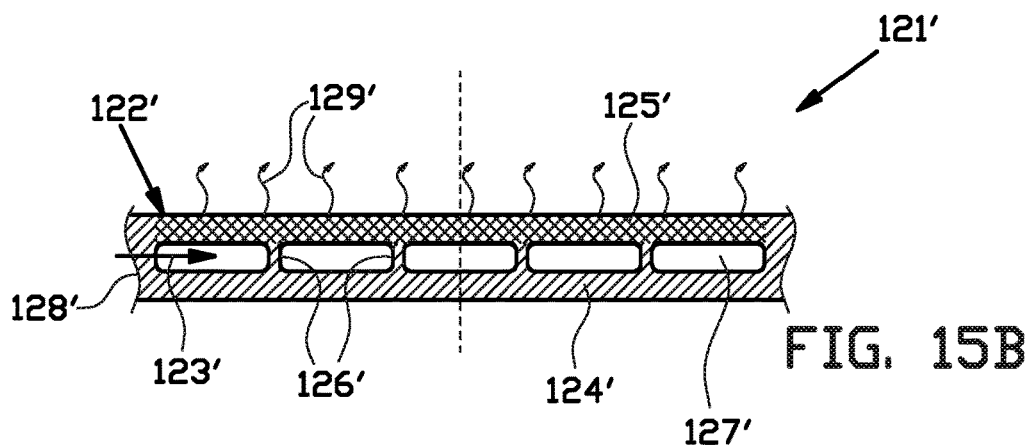
FIG. 15B is a schematic side view cross-section of a first alternative part of an outside wall of a transport device comprising an element according to the present invention.

FIG. 15B is a schematic side view cross-section of a first alternative part of an outside wall 121' of a transport device comprising an element 128' according to the present invention. The element 128' comprises a first layer 125' of an pervious or porous material, which is configured to allow a fluid 129' to flow there through. An outer surface 122' of said first layer 125' provides the non-stick surface. The element 128' comprises a second layer 124' of an impervious or solid material, which is configured to substantially block a flow of fluid there through. The second layer 124' is arranged at a side of said first layer 125' opposite to the outer surface 122'. The element 128' comprises a series of ducts 127' which are arranged in between said first and second layer. Said ducts are arranged in fluid connection with said pervious material and are configured for feeding a pressurized fluid to the pervious material. The first and second layer are interconnected via a series of studs or ribs 126'.

When introducing a pressurized fluid 123' into the ducts 127', the fluid 123' can flow through the first layer 125', which fluid 129' can interact with the boundary layer adjacent the outer surface 122'. For example, by using the fluid 129' the boundary layer may be made more turbulent in order to reduce the draft.

Preferably the first layer 125', the second layer 124', the one or more ducts 127', and the studs or ribs 126' are integrally formed using a three-dimensional printing tool.

Figure 15C:
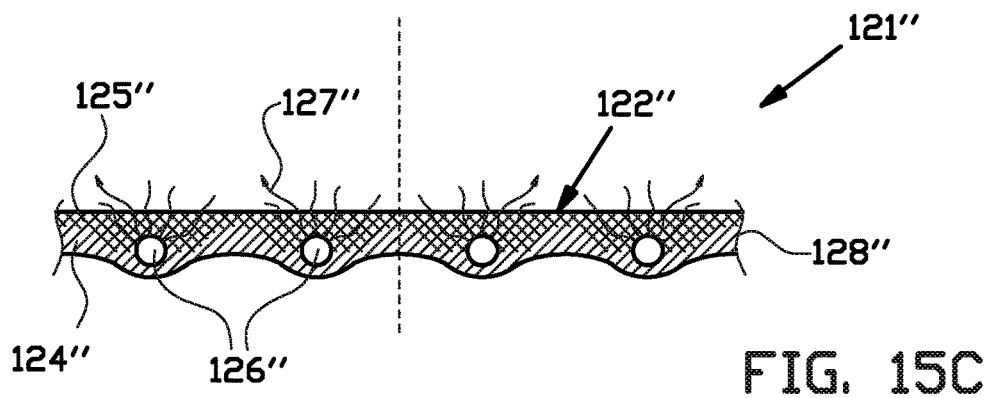
FIG. 15C is a schematic side view cross-section of a second alternative part of an outside wall of a transport device comprising an element according to the present invention.

FIG. 15C is a schematic side view cross-section of a second alternative part of an outside wall 121" of a transport device comprising an element 128" according to the present invention. The element 128" comprises a first layer 125" of an pervious or porous material, which is configured to allow a fluid 127" to flow there through. An outer surface 122" of said first layer 125" provides the non-stick surface. The element 128" comprises a second layer 124" of an impervious or solid material, which is configured to substantially block a flow of fluid there through. The second layer 124" is arranged at a side of said first layer 125" opposite to the outer surface 122". The element 128" comprises a series of ducts 126" which are arranged in between said first and second layer. Said ducts 126" are arranged in fluid connection with said pervious material and are configured for feeding a pressurized fluid to the pervious material. The first and second layer are substantially integrally formed.

When introducing a pressurized fluid into the ducts 126", the fluid can flow through the first layer 125", which fluid 127" can interact with the boundary layer adjacent the outer surface 122". For example, by using the fluid 127" the boundary layer may be made more turbulent in order to reduce the draft.

Figure 16:
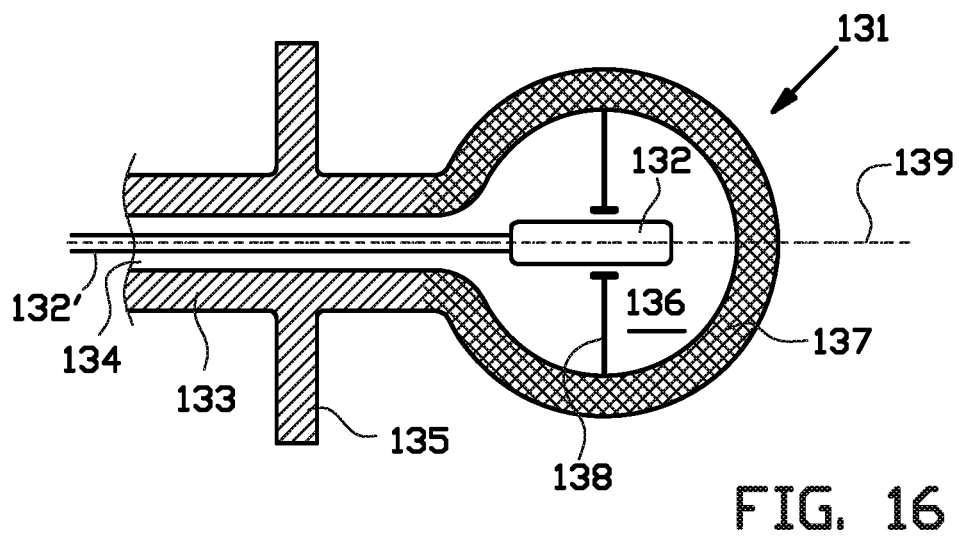
FIG. 16 is a schematic cross-section of a housing for a sensor according to the present invention.

Preferably the first layer 125", the second layer 124", and the one or more ducts 126" are integrally formed using a three-dimensional printing tool FIG. 16 shows a schematic cross section of a further example of an element 131. The element 131 is a housing for a sensor 132. The housing 131 is substantially rotation symmetric with respect to a centre line 139 and comprises a base part 133 which is substantially shaped as a tube with a longitudinal channel 134 which is used for positioning the sensor 132 inside the housing and for accommodating connecting cables 132' from the sensor 132 which connecting cables 132' extend from the sensor 132, along the channel 134 to the outside of said element 131. The base part 133 in this example, is provided with a flange member 135 for mounting and/or sealing the element 131 against a wall of a reactor or a duct, for example. The base part 133 and the flange member 135 are made from an impervious material.

The housing 131 further comprises a sensor chamber 136 comprising a circumferential wall 137. The circumferential wall 137 is arranged to substantially enclosing the sensor 132, and is made from a pervious material to allow a fluid to penetrate into the sensor chamber 136 to come into contact with the sensor which can measure one or more properties or characteristics of said fluid. As also schematically shown the sensor chamber 136 is provided with support members 138, which are preferably integrally formed with the circumferential wall 137, for holding the sensor 132.

Preferably, the housing 131, with the base part 133, the flange member 135, the circumferential pervious wall 137 and the support members, are integrally formed by means of a three-dimensional printing process for example as described above with reference to FIG. 1. It is noted that the three-dimensional printing process also provides a large freedom to form the housing 131, and in particular circumferential wall 137 of the sensor chamber 136 in any desired shape. For example, the circumferential wall 137 can be provide with one or more large openings at desired locations in said wall 137 to allow a certain flow of material to enter into or through the sensor chamber 136. Alternatively, the circumferential wall 137 can be provided with impervious parts at desired locations in said wall 137 to block a fluid to enter the sensor chamber 136 at said locations.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

It is noted that elements with integrally formed pervious and impervious parts can have big advantages when compared to elements where the pervious parts and impervious parts are manufactured separately and are connected to each other afterwards. In particular for apparatuses or parts thereof for the food industry, integrally formed parts are highly advantageous in view of hygienic requirements. Integrally formed parts are more easy manufacture and also more easy to clean.

In addition, multipart element usually comprises a seam or joint where the parts of the element are connected. At such a seam or joint, residual substances accumulate which can be difficult to remove. Such residual substances may therefor become a source for contamination and pose a hygienic hazard. In view of hygiene, a seamless or jointless transition between a pervious and impervious part, as provided by the present invention, is highly advantageous.

In summary, the invention relates to an element comprising a non-stick surface for substantially cleanly removing a product which is arranged against said non-stick surface. The element comprises a first layer of an pervious material, which is configured to allow a fluid to flow there through. An outer surface of said first layer provides the non-stick surface. The element comprises a second layer of an impervious material, which is configured to substantially block a flow of fluid there through. The second layer is arranged at a side of said first layer opposite to the outer surface. The element comprises ducts or chambers which are arranged in said first layer or in between said first and second layer. Said ducts or chambers are arranged in fluid connection with said pervious material and are configured for feeding a pressurized fluid to the pervious material. At least the first layer is formed using a three-dimensional printing tool.

The invention claimed is:

1. A method for producing an element comprising a non-stick surface for substantially cleanly removing a product which is arranged against said non-stick surface using a three-dimensional printer, wherein the method comprises the steps of:
providing a layer of granular material,
performing a printing process to form a printed layer by directing a laser beam at printing positions on or in said layer of granular material using a first set of printer settings or a second set of printer settings of said three-dimensional printer,
changing a set of printer settings of the printing process from the first set of printer settings to the second set of printer settings, or vice versa, during the forming of said printed layer,
wherein the first set of printer settings are configured such that during said printing process, particles of said granular material are partially fused together to form a material wherein a space between the particles is at least partially maintained to form the pervious part, such that a space between the particles in the pervious part is at least partially interconnected to allow a fluid to flow through the pervious part,
wherein the second set of printer settings are configured such that during said printing process, particles of said granular material are fused together to form a material wherein a space between the particles of the granular material is substantially removed to form the impervious part, and
wherein an outer surface of the pervious part provides the non-stick surface.

2. The method for producing an element according to claim 1, wherein the first printer settings are configured such that the pervious part comprises material between pores with a thickness smaller than a spot diameter of the laser beam at the printing position.

3. The method for producing an element according to claim 1, wherein the printer settings comprise one or more of the following:
a power of the laser beam at the printing position, wherein the power of the laser beam for printing the pervious part is lower than the power of the laser beam for printing the impervious part,
a scanning speed with which the laser beam is scanned over the layer of granular material during the three-dimensional printing process, wherein the scanning speed for printing the pervious part is higher than the scanning speed for printing the impervious part,
a distance between adjacent scanning lines along which the laser beam is scanned over the layer of granular material during the three-dimensional printing process, wherein the distance between adjacent scanning lines for printing the pervious part is higher than the distance between adjacent scanning lines for printing the impervious part, a distance between a focus position of the laser beam and the printing position, wherein the distance between the focus position of the laser beam and the printing position for printing the pervious part is higher than the distance between the focus position of the laser beam and the printing position for printing the impervious part.

4. A computer-readable medium comprising computer-executable instructions adapted to cause a three-dimensional printer to perform the method according to claim 1.

5. The method according to claim 1, wherein the second printer settings are configured such that the granular material is heated and melted to the point of liquefaction to form the impervious part.

6. The method according to claim 1,
wherein the element comprises a first layer comprising a pervious material, wherein the pervious material is configured to allow a fluid to flow there through, and wherein an outer surface of said first layer provides the non-stick surface, and
wherein the element comprises a second layer comprising an impervious material, wherein the impervious material is configured to substantially block a flow of the fluid there through, and wherein the second layer is arranged at a side of said first layer opposite to the outer surface,
wherein the element comprises one or more ducts or chambers which are arranged in said first layer or in between said first and second layer, wherein said one or more ducts or chambers are arranged in fluid connection with said pervious material and are configured for feeding a pressurized fluid to the pervious material,
wherein the first layer, the second layer and the one or more ducts or chambers are integrally formed using the three-dimensional printer, and wherein the first layer and/or the second layer comprises both pervious and impervious material which are arranged adjacent to each other in said respective layer.

7. The method according to claim 6, wherein the first layer and/or the one or more ducts or chambers are configured to distribute the fluid over the pervious material.

8. The method according to claim 7, wherein the first layer and/or the one or more ducts or chambers are configured to distribute the fluid over the non-stick surface.

9. The method according to claim 7, wherein the fluid comprises a liquid.

10. The method according to claim 6, wherein the one or more ducts or chambers extend in a direction parallel to the non-stick surface.

11. The method according to claim 6, wherein at least the first layer and/or the one or more ducts or chambers are configured to provide the same pressure drop of the pressurised fluid over the pervious material in a fluid path from the one or more ducts or chambers to the non-stick surface.

12. The method according to claim 6, wherein at least the first layer and/or the one or more ducts or chambers are configured to provide the same pressure of the pressurised fluid at the non-stick surface.

13. The method according to claim 6, wherein the element is configured to be a part of a moulding device for moulding three-dimensional products from a mass of food material.

14. The method according to claim 13, wherein the food material is a dough material.

15. The method according to claim 13, wherein the food material is a dough for industrial bakery application.

* * * * *